US011225331B2

(12) United States Patent
Wang et al.

(10) Patent No.: US 11,225,331 B2
(45) Date of Patent: Jan. 18, 2022

(54) METHOD AND SYSTEM FOR SUPPLYING POWER TO AN UNMANNED AERIAL VEHICLE

(71) Applicant: SZ DJI TECHNOLOGY CO., LTD., Shenzhen (CN)

(72) Inventors: Wentao Wang, Shenzhen (CN); Lei Zhang, Shenzhen (CN); Lei Wang, Shenzhen (CN); Bogao Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 587 days.

(21) Appl. No.: 16/055,770

(22) Filed: Aug. 6, 2018

(65) Prior Publication Data

US 2018/0354633 A1 Dec. 13, 2018

Related U.S. Application Data

(63) Continuation of application No. PCT/CN2016/091024, filed on Jul. 22, 2016.

(51) Int. Cl.
*B64D 27/24* (2006.01)
*H02J 7/00* (2006.01)
*H02J 7/32* (2006.01)
*H02J 7/34* (2006.01)
*B64D 31/06* (2006.01)

(52) U.S. Cl.
CPC ............ *B64D 27/24* (2013.01); *H02J 7/0029* (2013.01); *H02J 7/32* (2013.01); *H02J 7/345* (2013.01); *B64C 2201/042* (2013.01); *B64C 2201/066* (2013.01); *B64D 31/06* (2013.01); *Y02T 10/90* (2013.01)

(58) Field of Classification Search
None
See application file for complete search history.

(56) References Cited

U.S. PATENT DOCUMENTS

| | | | |
|---|---|---|---|
| 2009/0284644 A1 | 11/2009 | Mckaughan et al. | |
| 2011/0266996 A1* | 11/2011 | Sugano | B60L 3/0046 320/104 |
| 2012/0043943 A1* | 2/2012 | Dyer | B60L 58/26 320/137 |

(Continued)

FOREIGN PATENT DOCUMENTS

| | | |
|---|---|---|
| CN | 103580280 A | 2/2014 |
| CN | 104485725 A | 4/2015 |

(Continued)

OTHER PUBLICATIONS

The World Intellectual Property Organization (WIPO) International Search Report and Written Opinion for PCT/CN2016/091024 dated Apr. 27, 2017 9 Pages.

*Primary Examiner* — David V Henze-Gongola
(74) *Attorney, Agent, or Firm* — Anova Law Group, PLLC

(57) ABSTRACT

A method for supplying power to an unmanned aerial vehicle (UAV) includes converting heat generated by at least one energy component of the UAV into electrical power and supplying the electrical power to the UAV based on a flying status of the UAV and/or a discharge status of a power battery of the UAV. The power battery is a main power source of the UAV.

19 Claims, 21 Drawing Sheets

(56) References Cited

U.S. PATENT DOCUMENTS

| | | | | |
|---|---|---|---|---|
| 2015/0115108 A1* | 4/2015 | Benson | ............... | B60L 11/1809 |
| | | | | 244/53 R |
| 2016/0236790 A1* | 8/2016 | Knapp | .................... | B64C 11/44 |
| 2016/0336794 A1* | 11/2016 | Hsu | ....................... | H02J 50/001 |
| 2017/0088277 A1* | 3/2017 | Ghoshal | .................. | H01L 35/32 |
| 2017/0183095 A1* | 6/2017 | Liu | ....................... | B64C 39/024 |

FOREIGN PATENT DOCUMENTS

| | | |
|---|---|---|
| CN | 204642144 U | 9/2015 |
| CN | 205150262 U | 4/2016 |
| CN | 105706292 A | 6/2016 |
| WO | 02087501 A2 | 1/2002 |

\* cited by examiner

METHOD AND SYSTEM FOR SUPPLYING POWER TO AN UNMANNED AERIAL VEHICLE

CROSS-REFERENCE TO RELATED APPLICATION

This application is a continuation of International Application No. PCT/CN2016/091024, filed on Jul. 22, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platforms and more particularly, but not exclusively, to methods and systems for supplying power to an unmanned aerial vehicle.

BACKGROUND

Mobile platforms, such as unmanned aerial vehicles (UAVs), can be used for performing surveillance, reconnaissance, and exploration tasks for various applications. Heat management can be crucial to a mobile platform. For example, a UAV can be electrically powered by a battery and convert electrical energy into mechanical energy. However, efficiency of such conversion can be limited, and the electrical energy can be partially converted into heat that is wasted as thermal energy. Further, other various components of the UAV, such as battery, camera, vision sensor, likewise can generate heat during operation. Therefore, the UAV can be severely heated. The heating can significantly impact performance and life time of electronic devices and battery on the UAV.

To reduce heating, a fan is installed to cool down the UAV. However, the fan can increase power consumption of the UAV. The fan can also generate noise and increase size of UAV. User experience can be affected. In addition, for heat dissipation, the external construction of the UAV needs to consider ventilation and selection of material. Design choice of the UAV can be significantly restricted.

In view of the foregoing, there is a need for heat management in mobile platforms that overcome the disadvantages of currently-available methods and apparatuses.

SUMMARY

In accordance with a first aspect disclosed herein, there is set forth a method for supplying power to an unmanned aerial vehicle ("UAV"), comprising:

converting heat generated by at least one energy component of the UAV into electrical power; and supplying the electrical power to the UAV based on a flying status of the UAV and/or a discharge status of a power battery of the UAV, wherein the power battery is a main power source of the UAV.

In an exemplary embodiment of the disclosed methods, supplying the electrical power comprises supplying supplemental power to the UAV.

In another exemplary embodiment of the disclosed methods, supplying the electrical power comprises determining the flying status of the UAV.

In another exemplary embodiment of the disclosed methods, determining the flying status of the UAV comprises ascertaining that the UAV needs enhanced power output.

In another exemplary embodiment of the disclosed methods, supplying the electrical power comprises supplying the electrical power to the UAV when the UAV needs enhanced power output.

In another exemplary embodiment of the disclosed methods, supplying the electrical power comprises determining a discharge status of the power battery of the UAV.

In another exemplary embodiment of the disclosed methods, determining the discharge status comprises ascertaining that the power battery is low, the power battery is disconnected and/or there is a power failure of the power battery.

In another exemplary embodiment of the disclosed methods, supplying the electrical power comprises supplying the electrical power to the UAV to supplement the power battery when the power battery is below a predetermined battery power threshold.

In another exemplary embodiment of the disclosed methods, supplying the electrical power comprises supplying the electrical power to the UAV when the power battery is disconnected.

In another exemplary embodiment of the disclosed methods, supplying the electrical power comprises supplying the electrical power to the UAV when the power battery is in a preselected failure mode.

In another exemplary embodiment of the disclosed methods, converting the heat comprises generating the electrical power via a semiconductor thermoelectric device positioned on the UAV.

In another exemplary embodiment of the disclosed methods, generating the electrical power comprises:

creating a temperature difference between two surface regions of the semiconductor thermoelectric device positioned on the UAV; and generating the electrical power with the temperature difference.

In another exemplary embodiment of the disclosed methods, creating the temperature difference comprises heating a first surface region of the semiconductor thermoelectric device.

In another exemplary embodiment of the disclosed methods, heating the first surface region comprises collecting heat produced by the power battery of the UAV.

In another exemplary embodiment of the disclosed methods, collecting the heat comprises collecting the heat via a heat collector.

In another exemplary embodiment of the disclosed methods, heating the first surface region comprises conducting the heat collected by the heat collector onto the first surface region of the semiconductor thermoelectric device.

In another exemplary embodiment of the disclosed methods, creating the temperature difference comprises cooling a second surface region of the semiconductor thermoelectric device.

In another exemplary embodiment of the disclosed methods, cooling the second surface region comprises cooling the second surface region via a heat dissipator.

In another exemplary embodiment of the disclosed methods, cooling the second surface region comprises absorbing heat from at least part of the second surface region via the heat dissipator.

In another exemplary embodiment of the disclosed methods, cooling the second surface region comprises cooling the heat dissipator with air adjacent to the UAV.

In another exemplary embodiment of the disclosed methods, cooling the heat dissipator comprises reducing a temperature of the air via airflow created by one or more propellers of the UAV.

Exemplary embodiments of the disclosed methods further comprise storing the generated electrical power.

In another exemplary embodiment of the disclosed methods, storing the generated electrical power comprises charging a supercapacitor.

In another exemplary embodiment of the disclosed methods, supplying the electrical power comprises supplying stored electrical power from the supercapacitor to a propulsion unit of the UAV.

In another exemplary embodiment of the disclosed methods, supplying the generated electrical power comprises controlling the power supplied by the supercapacitor.

In another exemplary embodiment of the disclosed methods, controlling the power supply comprises controlling the charging and/or the supplying via a micro-controller unit ("MCU").

In another exemplary embodiment of the disclosed methods, controlling comprises sampling a voltage and/or a current of the supercapacitor.

In another exemplary embodiment of the disclosed methods, controlling comprises managing the charging and/or the supplying based on the sampling.

In another exemplary embodiment of the disclosed methods, managing comprises activating the charging at a first time and activating the supplying at a second time that is different from the first time.

In accordance with another aspect disclosed herein, there is set forth a system for supplying power to an unmanned aerial vehicle ("UAV"), comprising:

one or more processors, individually or collectively, configured to:

convert heat generated by at least one energy component of the UAV into electrical power; and supply the electrical power to the UAV based on a flying status of the UAV and/or a discharge status of a power battery of the UAV, wherein the power battery is a main power source of the UAV.

In an exemplary embodiment of the disclosed systems, the one or more processors are configured to supply the electrical power as a supplemental power to the UAV.

In another exemplary embodiment of the disclosed systems, the one or more processors are configured to determine the flying status of the UAV.

In another exemplary embodiment of the disclosed systems, the flying status of the UAV comprises whether the UAV needs enhanced power output.

In another exemplary embodiment of the disclosed systems, the one or more processors are configured to supply the electrical power to the UAV when the UAV needs enhanced power output.

In another exemplary embodiment of the disclosed systems, the one or more processors are configured to determine a discharge status of the power battery of the UAV.

In another exemplary embodiment of the disclosed systems, the discharge status comprises whether the power battery is low, the power battery is disconnected and/or there is a power failure of the power battery.

In another exemplary embodiment of the disclosed systems, the one or more processors are configured to supply the electrical power to the UAV to supplement the power battery when the power battery is below a predetermined battery power threshold.

In another exemplary embodiment of the disclosed systems, the one or more processors are configured to supply the electrical power to the UAV when the power battery is disconnected.

In another exemplary embodiment of the disclosed systems, the one or more processors are configured to supply the electrical power to the UAV when the power battery is in a preselected failure mode.

Exemplary embodiments of the disclosed systems further comprise a semiconductor thermoelectric device positioned on the UAV for generating the electrical power.

In another exemplary embodiment of the disclosed systems, the semiconductor thermoelectric device is provided with two surface regions for capturing a temperature difference, and wherein the semiconductor thermoelectric device is positioned on the UAV and configured to generate electrical power with the temperature difference.

In another exemplary embodiment of the disclosed systems, the temperature difference is created by heating a first surface region of the semiconductor thermoelectric device.

In another exemplary embodiment of the disclosed systems, the first surface region is heated by collecting heat produced by the power battery the UAV.

Exemplary embodiments of the disclosed systems further comprise a heat collector for collecting the heat generated by the power battery.

In another exemplary embodiment of the disclosed systems, the heat collected is conducted onto the first surface region of the semiconductor thermoelectric device.

In another exemplary embodiment of the disclosed systems, the temperature difference is created by cooling a second surface region of the semiconductor thermoelectric device.

Exemplary embodiments of the disclosed systems further comprise a heat dissipator for cooling the second surface region.

In another exemplary embodiment of the disclosed systems, the heat dissipator is configured to absorb heat from at least part of the second surface region.

In another exemplary embodiment of the disclosed systems, the heat dissipator is cooled with air adjacent to the UAV.

Exemplary embodiments of the disclosed systems further comprise one or more propellers of the UAV for reducing a temperature of the air via airflow.

Exemplary embodiments of the disclosed systems further comprise a supercapacitor configured to store the generated electrical power.

In another exemplary embodiment of the disclosed systems, the electrical power is charged into the supercapacitor.

In another exemplary embodiment of the disclosed systems, the supercapacitor is configured to supply the stored electrical power to a propulsion unit of the UAV.

Exemplary embodiments of the disclosed systems further comprise a micro-controller unit ("MCU") configured to control the power supplied by the supercapacitor.

In another exemplary embodiment of the disclosed systems, the MCU is configured to sample a voltage and/or a current of the supercapacitor.

In another exemplary embodiment of the disclosed systems, the MCU is configured to manage a charge and a supply of the supercapacitor based on the sample.

In another exemplary embodiment of the disclosed systems, the MCU is configured to activate the charge at a first time and the supply at a second time that is different from the first time.

In accordance with another aspect disclosed herein, there is set forth an unmanned aerial vehicle ("UAV"), comprising:

a power supply system being provided in accordance with any one of previous embodiments of the disclosed systems; and a propulsion unit being associated with the power supply system, wherein the power supply system is configured to supply power to the propulsion unit.

In accordance with another aspect disclosed herein, there is set forth a method for protecting a battery, comprising:

determining a temperature of the battery; and managing the temperature of the battery via heat-electricity conversion.

In an exemplary embodiment of the disclosed methods, managing the temperature comprises maintaining the temperature via a semiconductor thermoelectric device.

In another exemplary embodiment of the disclosed methods, determining the temperature comprises determining whether the temperature is less than a predetermined low temperature threshold.

In another exemplary embodiment of the disclosed methods, managing the temperature comprises heating the battery upon determining that the temperature is less than the predetermined low temperature threshold.

In another exemplary embodiment of the disclosed methods, heating the battery comprises heating the battery via the semiconductor thermoelectric device.

In another exemplary embodiment of the disclosed methods, heating the battery comprises conducting an electric current in a first direction to the semiconductor thermoelectric device.

In another exemplary embodiment of the disclosed methods, heating the battery via the semiconductor thermoelectric device comprises heating the battery via a first Peltier effect.

In another exemplary embodiment of the disclosed methods, heating the battery via the first Peltier effect comprises controlling the electric current to the semiconductor thermoelectric device to adjust the first Peltier effect.

In another exemplary embodiment of the disclosed methods, determining the temperature comprises determining whether the temperature is greater than a first predetermined high temperature threshold.

In another exemplary embodiment of the disclosed methods, managing the temperature comprises force cooling the battery via the semiconductor thermoelectric device upon determining that the temperature is greater than the first predetermined high temperature threshold.

In another exemplary embodiment of the disclosed methods, force cooling the battery comprises cooling the battery via the semiconductor thermoelectric device.

In another exemplary embodiment of the disclosed methods, force cooling the battery comprises conducting an electric current in a second direction to the semiconductor thermoelectric device, wherein the second direction opposites to the first direction.

In another exemplary embodiment of the disclosed methods, cooling the battery via the semiconductor thermoelectric device comprises cooling the battery via a second Peltier effect.

In another exemplary embodiment of the disclosed methods, cooling the battery comprises controlling the electric current to the semiconductor thermoelectric device to adjust the second Peltier effect.

In another exemplary embodiment of the disclosed methods, determining the temperature comprises determining whether the temperature is greater than a second predetermined high temperature threshold and less than the first temperature threshold.

In another exemplary embodiment of the disclosed methods, managing the temperature comprises cooling the battery via the semiconductor thermoelectric device upon the determining that the temperature is greater than the second predetermined high temperature threshold and less than the first temperature threshold.

In another exemplary embodiment of the disclosed methods, cooling the battery via the semiconductor thermoelectric device comprises forming a conductive path to the semiconductor thermoelectric device to effectuate a Seebeck effect.

In another exemplary embodiment of the disclosed methods, cooling the battery comprises controlling a temperature difference between a first surface region and a second surface region of the semiconductor thermoelectric device to control a force cooling effect of the semiconductor thermoelectric device.

In another exemplary embodiment of the disclosed methods, the second predetermined high temperature threshold is less than the first predetermined high temperature threshold.

Exemplary embodiments of the disclosed systems further comprise generating electrical power via the temperature difference between the first surface region and the second surface region of the semiconductor thermoelectric device when the temperature is greater than the first predetermined high temperature threshold and less than the second predetermined high temperature threshold.

In another exemplary embodiment of the disclosed methods, generating electrical power comprises:

conducting the heat generated by the battery to the first surface region of the semiconductor thermoelectric device; and cooling the second surface region of the semiconductor thermoelectric device.

In another exemplary embodiment of the disclosed methods, conducting the heat comprises collecting the heat from the battery.

In another exemplary embodiment of the disclosed methods, collecting the heat comprises collecting the heat via a heat collector.

In another exemplary embodiment of the disclosed methods, cooling the second surface region of the semiconductor thermoelectric device comprises conducting the heat to a heat dissipator.

In another exemplary embodiment of the disclosed methods, cooling the second surface region comprises exposing at least a portion of the heat dissipator to air adjacent to the semiconductor thermoelectric device.

In another exemplary embodiment of the disclosed methods, exposing the dissipator comprises cooling the air adjacent of the semiconductor thermoelectric device with an airflow being created by an unmanned aerial vehicle ("UAV") accommodating the semiconductor thermoelectric device.

Exemplary embodiments of the disclosed systems further comprise storing the generated electrical power.

In another exemplary embodiment of the disclosed methods, storing the generated electrical power comprises charging the electrical power into a supercapacitor.

Exemplary embodiments of the disclosed systems further comprise supplying the generated electrical power from the supercapacitor to one or more power-consuming components of the UAV.

In another exemplary embodiment of the disclosed methods, supplying the generated electrical power comprises controlling the power supply from the supercapacitor.

In another exemplary embodiment of the disclosed methods, the battery is within an intelligent battery module.

In another exemplary embodiment of the disclosed methods, the battery is a power battery of an unmanned aerial vehicle.

In accordance with another aspect disclosed herein, there is set forth a system for protecting a battery, comprising:

one or more processors, individually or collectively, operate to:

determine a temperature of the battery; and manage the temperature of the battery via heat-electricity conversions.

Exemplary embodiments of the disclosed systems further comprise a semiconductor thermoelectric device configured to maintain the temperature of the battery.

In an exemplary embodiment of the disclosed systems, the one or more processors are configured to determine whether that the temperature is less than a predetermined low temperature threshold.

In an exemplary embodiment of the disclosed systems, the semiconductor thermoelectric device is configured to heat the battery based upon determining that the temperature is less than the predetermined low temperature threshold.

In an exemplary embodiment of the disclosed systems, the one or more processors are configured to conduct an electric current in a first direction to the semiconductor thermoelectric device.

In an exemplary embodiment of the disclosed systems, the semiconductor thermoelectric device is configured to heat the battery via a first Peltier effect.

In an exemplary embodiment of the disclosed systems, the one or more processors are configured to control the electric current to the semiconductor thermoelectric device to adjust the first Peltier effect.

In an exemplary embodiment of the disclosed systems, the one or more processors are configured to determine whether the temperature is greater than a first predetermined high temperature threshold.

In an exemplary embodiment of the disclosed systems, the semiconductor thermoelectric device is configured to forcedly cool the battery upon the temperature is determined greater than a first predetermined high temperature threshold.

In an exemplary embodiment of the disclosed systems, the one or more processors are configured to conduct an electric current in a second direction to the semiconductor thermoelectric device, wherein the second direction opposites to the first direction.

In an exemplary embodiment of the disclosed systems, the semiconductor thermoelectric device is configured to forcedly cool the battery by the electric current via a second Peltier effect.

In an exemplary embodiment of the disclosed systems, the one or more processors are configured to control the electric current to the semiconductor thermoelectric device to adjust the second Peltier effect.

In an exemplary embodiment of the disclosed systems, the one or more processors are configured to determine whether the temperature is greater than a second predetermined high temperature threshold and less than the first temperature threshold.

In an exemplary embodiment of the disclosed systems, the semiconductor thermoelectric device is configured to cool the battery upon the determined temperature when the temperature is greater than the second predetermined high temperature threshold and less than the first temperature threshold.

In an exemplary embodiment of the disclosed systems, the semiconductor thermoelectric device is configured to cool the battery by forming a conductive path to effectuate a Seebeck effect.

In an exemplary embodiment of the disclosed systems, the one or more processors are configured to control a temperature difference between a first surface region and a second surface region of the semiconductor thermoelectric device to control the Seebeck effect.

In an exemplary embodiment of the disclosed systems, the second predetermined high temperature threshold is less than the first predetermined high temperature threshold.

In an exemplary embodiment of the disclosed systems, the semiconductor thermoelectric device is configured to generate electrical power via the temperature difference between the first surface region and the second surface region of the semiconductor thermoelectric device when the temperature is greater than the first predetermined high temperature threshold and less than the second predetermined high temperature threshold.

In an exemplary embodiment of the disclosed systems, the semiconductor thermoelectric device is arranged for conducting the heat generated by the battery to the first surface region of the semiconductor thermoelectric device and for cooling the second surface region of the semiconductor thermoelectric device.

Exemplary embodiments of the disclosed systems further comprise a heat collector for collecting the heat generate by the battery.

Exemplary embodiments of the disclosed systems further comprise a heat dissipator for cooling the second surface region the semiconductor thermoelectric device.

In an exemplary embodiment of the disclosed systems, at least a portion of the heat dissipator is exposed to air adjacent to the semiconductor thermoelectric device.

In an exemplary embodiment of the disclosed systems, the air adjacent of the semiconductor thermoelectric device is cooled with an airflow being created by an unmanned aerial vehicle ("UAV") accommodating the semiconductor thermoelectric device.

Exemplary embodiments of the disclosed systems further comprise a supercapacitor for storing the generated electrical power.

In an exemplary embodiment of the disclosed systems, the supercapacitor supplies the stored electrical power to one or more power-consuming components of the UAV.

In an exemplary embodiment of the disclosed systems, the one or more processors are configured to control the power supply from the supercapacitor.

In an exemplary embodiment of the disclosed systems, the battery is within an intelligent battery module.

In an exemplary embodiment of the disclosed systems, the battery is a power battery of an unmanned aerial vehicle.

An intelligent battery module, comprising:

a housing;

energy storage components enclosed within the housing; and a system for protecting the battery being enclosed in the housing and being provided in accordance with any one of previous embodiments of the disclosed systems, wherein the system is configured to control a temperature inside the housing in order to meet temperature requirements of the energy storage components.

An unmanned aerial vehicle ("UAV"), comprising:

a fuselage;

a battery enclosed within the fuselage; and a system for protecting the battery being enclosed in the fuselage and being provided in accordance with any one of previous embodiments of the disclosed systems, wherein the system is configured to control a temperature inside the fuselage in order to meet temperature requirements of the battery.

Figure 1:
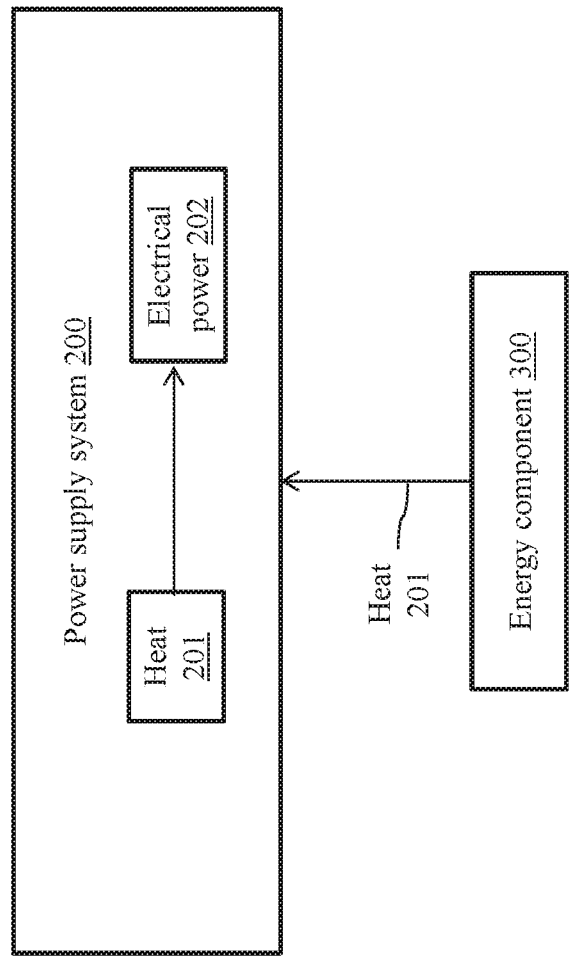
FIG. 1 is an exemplary diagram illustrating an embodiment of an unmanned aerial vehicle (UAV) comprising a power supply system.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available methods and apparatuses are incapable of managing heat in a UAV while maintaining low power consumption and good user experience, a method and apparatus that achieves effective heat management in a UAV without increasing power consumption can prove desirable and provide a basis for a wide range of applications, such as a UAV to meet requirements including light-weight structure, low power consumption and/or flexible choices in structure. This result can be achieved, according to embodiments disclosed herein, by a UAV 100 as illustrated in FIG. 1.

Colloquially referred to as "drone," the UAV 100 is an aircraft without a human pilot (or operator) onboard the vehicle whose flight is controlled autonomously or by a remote pilot (or sometimes both). The UAV 100 is finding increased usage in various applications involving various aerial operations, such as data-gathering or delivery. The present systems and methods are suitable for many types of UAVs 100 including, without limitation, quadcopters (also referred to a quadrotor helicopters or quad rotors), single rotor, dual rotor, trirotor, hexarotor, and octorotor rotorcraft UAVs 100, fixed wing UAVs 100, and hybrid rotorcraft-fixed wing UAVs 100.

FIG. 1 shows the UAV 100 as including a power supply system 200 coupled to an energy component 300. The energy component 300 can include any component onboard the UAV 100 that can generate heat 201 as a byproduct of the energy component 300. The heat 201 can be provided to the power supply system 200. The power supply system 200 can convert the heat 201 into electrical power 202. The power supply system 200 can supply the electrical power 202 to the UAV 100.

Figure 2:
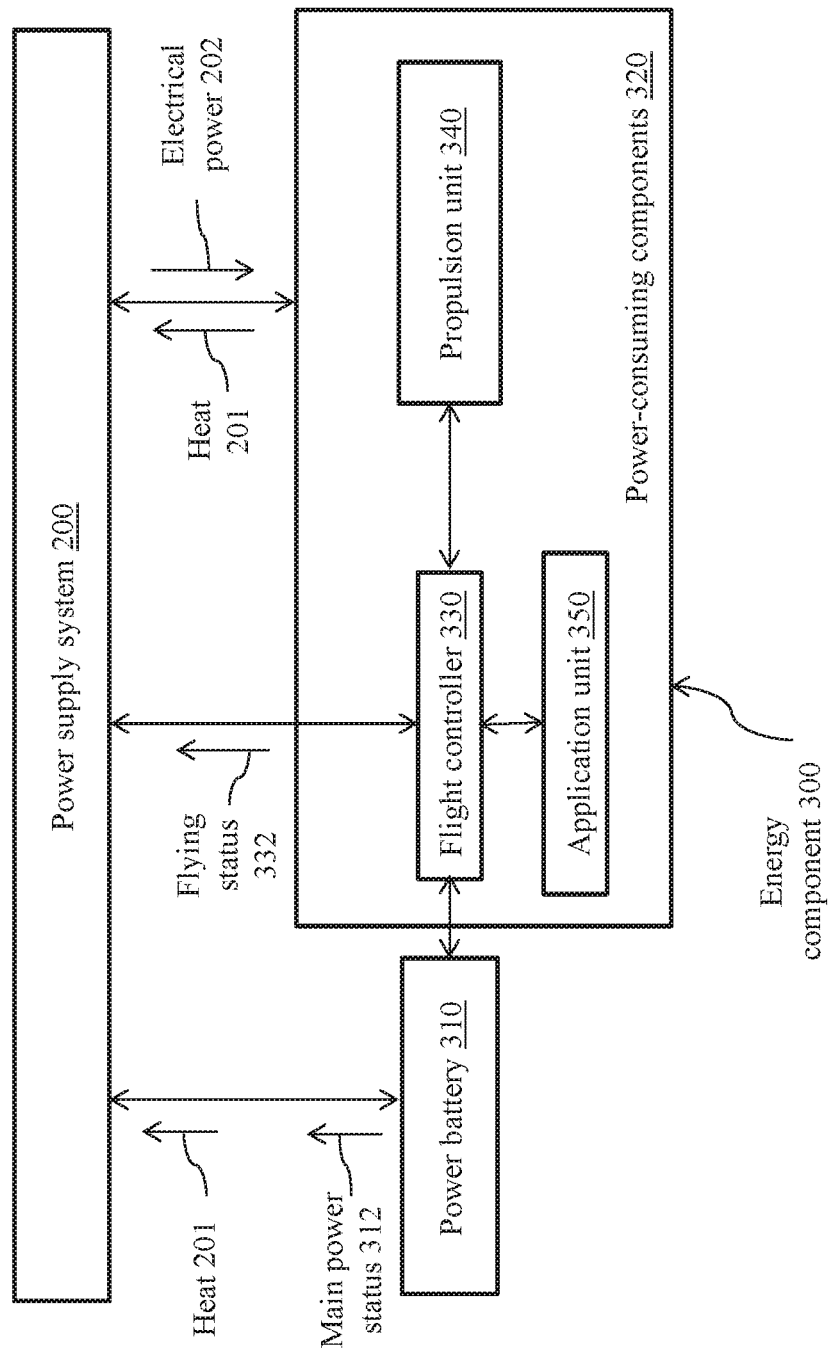
FIG. 2 is an exemplary diagram illustrating an alternative embodiment of the UAV of FIG. 1, wherein the UAV includes a power battery.

Turning to FIG. 2, an alternative embodiment of the UAV 100 is shown. In the UAV 100 of FIG. 2, the power supply system 200 of the UAV 100 is associated with a power battery 310. The power battery 310 can be an energy component 300 and can include any device that can be a main power source for powering the UAV 100. Stated somewhat differently, the UAV 100 can obtain power from the power battery 310 in any circumstances unless the power battery 310 is not available. An exemplary power battery 310 can include any conventional type of battery including, but not limited to, lead-acid battery, lithium air battery, lithium-ion battery, nickel-cadmium battery, nickel-metal hydrogen battery, or a combination thereof. Optionally, the power battery can be rechargeable.

FIG. 2 shows the energy component 300 as including one or more power-consuming components 320. Each of the power-consuming components 320 can include a component aboard the UAV 100 that consumes power. As shown in FIG. 2, for example, the power-consuming components 320 can include a flight controller 330 for directing some or all operations of the UAV 100.

Additionally and/or alternatively, as shown in FIG. 2, the power-consuming components 320 can include a propulsion unit 340 for providing a force to propel the UAV 100. The propulsion unit 340 can include one or more propellers 342 (shown in FIG. 11) each being coupled to an actuation mechanism 341 (shown in FIG. 11). An exemplary actuation mechanism can include a motor.

The propulsion unit 340 can be in communication with the flight controller 330. In one example, the flight controller 330 can send a motor control signal to the actuation mechanism 341. The motor control signal can control operation of the motor. In another example, the propulsion unit 340 can include a motor controller in communication with the flight controller 330. Based on instruction from the flight controller 330, the propulsion unit 340 can send the motor control signal to the motor for operating the motor. Additionally and/or alternatively, as shown in FIG. 2, the power-consuming components 320 can include at least one application unit 350. The application unit 350 can include any component aboard the UAV 100 that implements computation function that compliments and/or assists function of the flight controller 330. For example, the application unit 350 can include an imaging device such as a camera, a sensor such as vision sensor, and/or a communication module for data transmission such as image transmission.

Each of the energy components 300 can generate the heat 201 during operation. The power supply system 200 can convert the heat 201 into the electrical power 202. The power supply system 200 can be electrically connected with a selected power-consuming component 320 to supply the electrical power 202 to the selected power-consuming component 320.

As shown in FIG. 2, the flight controller 330 can send a flying status 332 of the UAV 100 to the power supply system 200. The flying status 332 can include any information related to operations of the UAV 100. Exemplary flying status 332 can include parameters of power supplied from the power battery 310 and/or power requirement of a current operation of the UAV 100. For example, the flying status 332 can indicate whether the power supplied from the power battery 310 is sufficient for the current operation of the UAV 100.

Additionally and/or alternatively, the power battery 310 can send a main power status 312 to the power supply system 200. The main power status 312 can include any information related to status of the power battery 310. Exemplary main power status 312 can include a discharge status of the main power source 310. The discharge status can include parameters of power supplied from the power battery 310, such as an output current and/or an output voltage of the power battery 310.

Although FIG. 2 shows the power supply system 200 as receiving the main power status 312 from the power battery 310 for illustrated purposes only, the power supply system 200 can receive the main power status 312 from another component of the UAV 100. For example, the power battery 310 can be in communication with the flight controller 330. The flight controller 330 can obtain and/or ascertain the main power status 312 and send the same to the power supply system 200.

Figure 3:
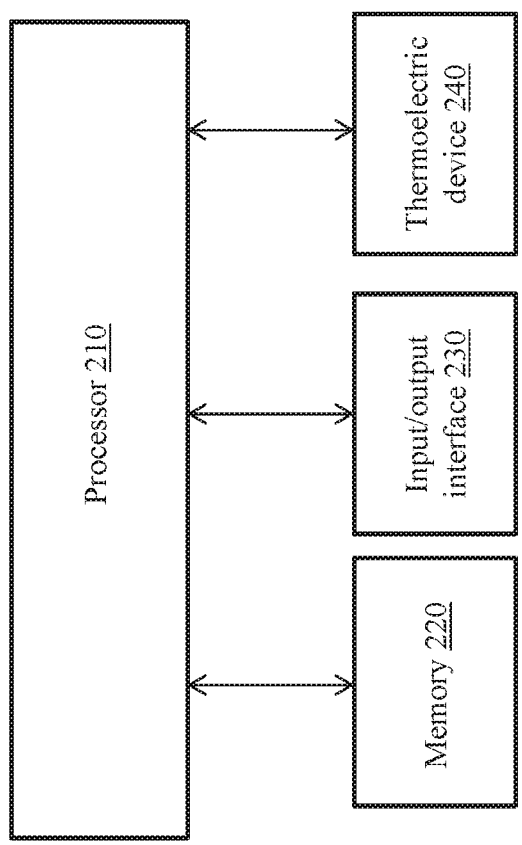
FIG. 3 is an exemplary diagram illustrating an alternative embodiment of the power supply system of FIG. 1, wherein the power supply system includes a thermoelectric device.

FIG. 3 shows an exemplary power supply system 200. The power supply system 200 is shown as including a processor 210. The processor 210 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like. Although one processor 210 is shown in FIG. 3 for illustrated purposes only, the processor 210 can include any number of uniform and/or different processors 210.

The power supply system 200 can include one or more additional hardware components and/or software components for performing the power supply functions and operations described herein. Exemplary additional hardware components include, but are not limited to, a memory 220, alternatively referred to herein as a non-transitory computer-readable storage medium. The memory 220 can include any computer-readable storage medium for storing machine-executable code. Exemplary memory 220 can include a random access memory (RAM), static RAM, dynamic RAM, read-only memory (ROM), programmable ROM, erasable programmable ROM, electrically erasable programmable ROM, flash memory, secure digital (SD) card, magnetic disk, optical disk, etc. Instructions for execution by the processor 210 can be stored on the memory 220 as a computer program product. The processor 210 and the memory 220 can be provided in an integrated and/or discrete manner. Although one memory 220 is shown in FIG. 3 for illustrated purposes only, the power supply system 200 can include any number of uniform and/or different memories 220.

Additionally and/or alternatively, as shown in FIG. 3, the power supply system 200 can include at least one input/output interface 230. Exemplary input/output interface 230 can include, but are not limited to, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces. The power supply system 200 can communicate with the flight controller 330 and/or the power battery 310 (shown in FIG. 2) via the input/output interface 230.

As shown in FIG. 3, the power supply system 200 can include at least one thermoelectric device 240 electrically coupled to the processor 210. The thermoelectric device 240 can include any type of device that can achieve conversion between the heat 201 (shown in FIG. 2) and the electrical energy 202 (shown in FIG. 2) based on a thermoelectric effect. Stated somewhat differently, the thermoelectric device 240 can realize conversion between a temperature difference and an electric voltage and/or an electric current. The thermoelectric device 240 can be made of a thermoelectric material. Based on the type of thermoelectric material, the thermoelectric device 240 can include, for example, a metallic thermoelectric device, a semiconductor thermoelectric device, an inorganic thermoelectric device, an organic thermoelectric device, or a combination thereof. In one embodiment, the thermoelectric device 240 can include a semiconductor thermoelectric device that is made of one or more semiconductor thermoelectric materials, including, but not limited to, doped lead telluride alloy (PbTe), inorganic clathrates of group III and/or IV atoms, magnesium group IV compounds, silicides, organic semiconductors, silicongermanium, PbTe/PbSeTe quantum dot superlattice, nanocrystalline transition metal silicides, graphene, and/or tin selenide.

The processor 210, the memory 220 and/or the input/output interface 240 can be configured to communicate, for example, using hardware connectors and buses and/or in a wireless manner. In certain embodiments, the power supply system 200 can be at least partially integrated with the power battery 310 (shown in FIG. 2) and/or the flight controller 330 (shown in FIG. 2). For example, the processor 210 and/or the memory 220 can be at least partially integrated with the power battery 310 and/or the flight controller 330.

Figure 4:
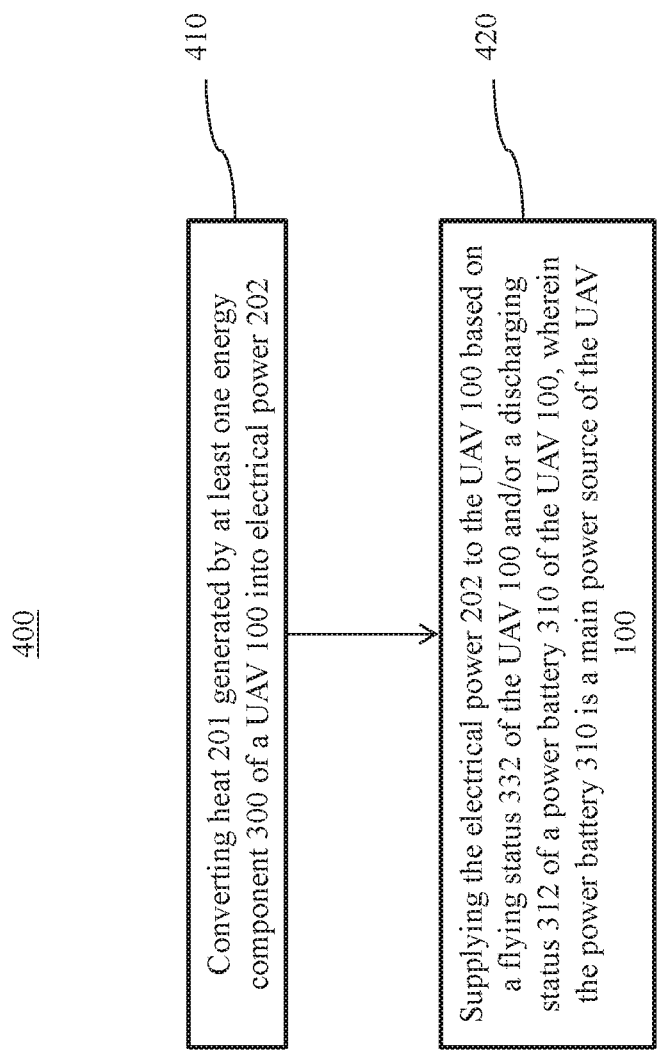
FIG. 4 is an exemplary top-level flow chart illustrating an embodiment of a method for supplying power to the UAV of FIG. 1.

Turning to FIG. 4, an exemplary method 400 for supplying power to the UAV 100 is shown. In one embodiment, the method 400 can be implemented on the power supply system 200 set forth above with reference to FIG. 1. As shown in FIG. 4, the heat 201 produced by at least one energy component 300 of the UAV 100 can be converted, at 410, into the electrical power 202. The electrical power 202 can be supplied to the UAV 100, at 420, based on the flying status 332 of the UAV 100 and/or the discharge status 312 of the power battery of the UAV 100. The power battery 310 can be the main power source of the UAV 100.

By communicating with the power battery 310 (shown in FIG. 2) and/or the flight controller 330 (shown in FIG. 2), the power supply system 200 can determine the flying status 332 and/or the discharge status 312. Based on the flying status 332 and/or the discharge status 312, the power supply system 200 can ascertain whether the UAV 100 needs a supplemental power. Upon ascertaining that the UAV 100 needs the supplemental power, the power supply system 200 can supply the electrical power 202 as the supplemental power to the UAV 100. For example, the UAV 100 may need the supplemental power in a situation that the UAV 100 needs enhanced power output, the power battery 310 is low, the power battery 310 is disconnected, and/or there is a power failure of the power battery 310. The power battery 310 can be low when a power level of the power battery 310 is below a predetermined threshold value.

In one embodiment, the UAV 100 may need enhanced power output. For example, the flying status 332 can indicate that the UAV 100 is accelerating, ascending, and/or moving against a head wind; so, more propulsion is needed. Thus, power output from the power battery needs to be enhanced within a short time. The power supply system 200 can supply the electrical power 202 to supplement the power output from the power battery. Thus, the power supply system 200 can help to ensure that the UAV 100 is sufficiently powered. Additionally and/or alternatively, the power battery 310 can avoid outputting power at or beyond highest capacity; so, safety of the power battery 310 can be ensured.

Additionally and/or alternatively, the power battery 310 can be low, e.g., below a predetermined battery power threshold. Stated somewhat differently, the power battery 310 can be defective or operate in adverse condition such as low temperature; so, power output from the power battery 310 can be less than requirement of the UAV 100. For example, the discharge status 312 can indicate output voltage and/or current of the power battery 310 being less than a requirement indicated in the flying status 332. The power supply system 200 can supply the electrical power 202 to supplement the power output from the power battery. Thus, the power supply system 200 can advantageously ensure that the UAV 100 is sufficiently powered for safe operation.

Additionally and/or alternatively, in some cases, the power battery 310 can become disconnected from other components of the UAV 100. For example, the power battery 310 can be disconnected for replacement. In another example, the power battery 310 can be disconnected due to a failure of electrical connection between the power battery 310 and another component of the UAV 100. The flying status 332 can indicate a failure of power output and/or communication failure with the power battery 310, e.g., the power battery is in a preselected failure mode. The power supply system 200 can thus supply the electrical power 202 to the UAV 100 for uninterrupted power supply. In one example, the power supply system 200 can supply the electrical power 202 to the flight controller 330 and/or the propulsion unit 340 (shown in FIG. 2). The flight controller 330 can optionally instruct the propulsion unit 340 for executing an emergency landing. Thus, the power supply system 200 can advantageously ensure that the UAV 100 is powered for safe operation.

Additionally and/or alternatively, the power battery 310 can have a power failure. Stated somewhat differently, the power battery 310 can be defective or damaged during operation. For example, the flying status 332 can indicate a failure of power output. The power supply system 200 can thus supply the electrical power 202 to the UAV 100 for uninterrupted power supply. In one embodiment, the flight controller 330 can switch from the power battery to the power supply system 200 for power supply. Thus, the power supply system 200 can advantageously ensure that the UAV 100 is continuously powered for safe operation.

In one embodiment, the method 400 can advantageously implement heat management for the UAV 100 without a need for installing a fan. Thus, power consumption and noise increase due to the fan can be avoided. Additionally and/or alternatively, the thermoelectric device 240 can have a volume that is smaller than volume of the fan. The thermoelectric device 240 does not generate significant noise. User experience can thus be improved. Structure of the UAV 100 does not need to consider ventilation required by the fan. Construction of the UAV 100 can have less restriction and more flexibility. Further, the heat 201 can be used for generating the electrical power 202 to power components of the UAV 100 and/or extend operation duration of the UAV 100. Performance and life time of electronic devices and battery on the UAV 100 can be improved and the UAV 100 can be more energy efficient.

Figure 5:
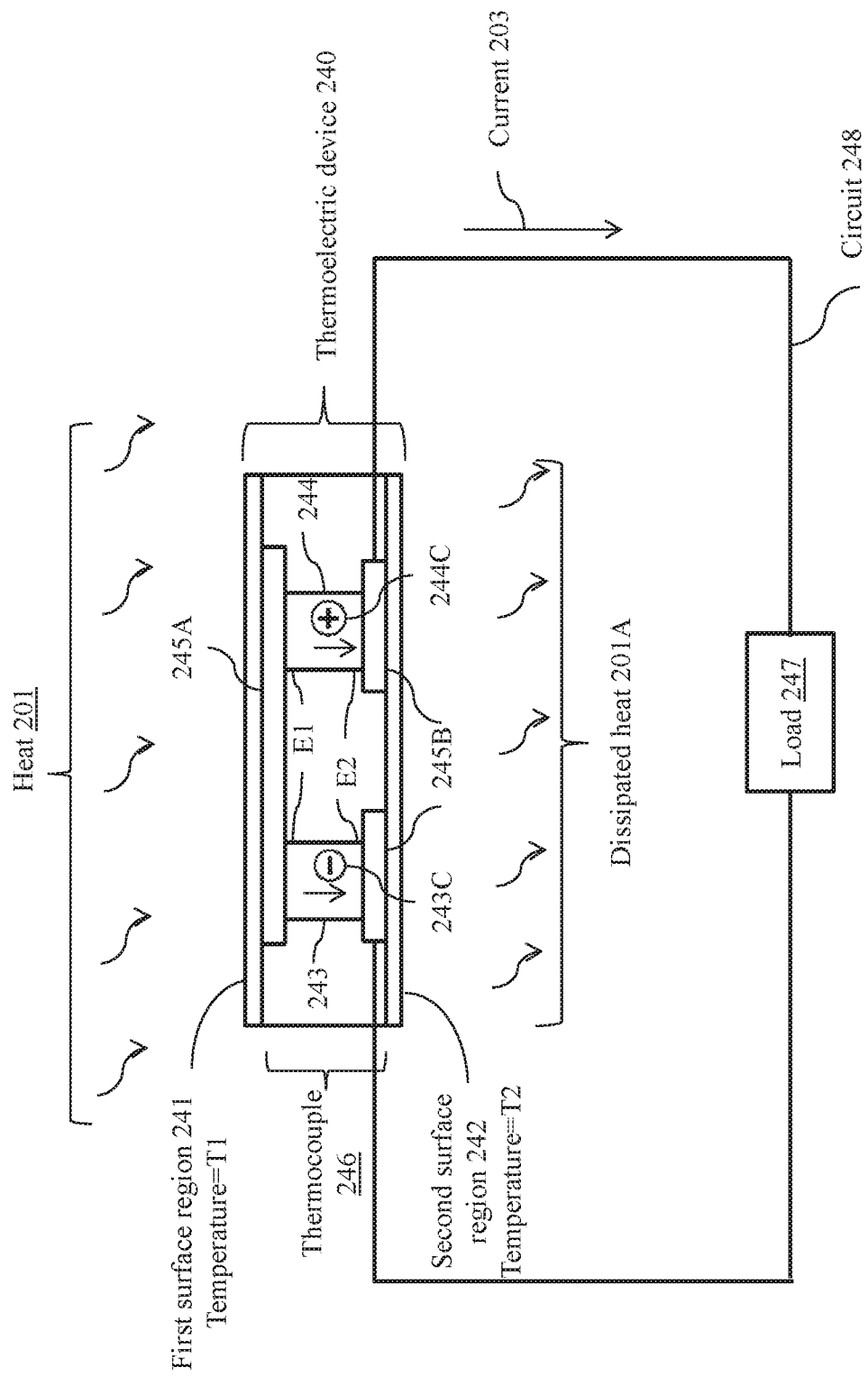
FIG. 5 is an exemplary diagram illustrating an alternative embodiment of the thermoelectric device of FIG. 3, wherein the thermoelectric device includes a semiconductor thermoelectric device.

Turning to FIG. 5, an exemplary thermoelectric device 240 is shown. The thermoelectric device 240 can include at least one thermocouple 246 sandwiched between a first surface region 241 and a second surface region 242. The surface regions 241, 242 can each include a thermally conductive substrate. As shown in FIG. 5, the first surface region 241 can be heated by the heat 201. The first surface region 241 can have a first temperature T1. Heat 201A, also referred to as dissipated heat 201A, can escape from the thermoelectric device 240 via the second surface region 242. The second surface region 242 can be cooled and thus have a second temperature T2, where T2 is less than T1.

The thermocouple 246 can include two different thermoelectric materials that can include, as illustratively shown in FIG. 5, an n-type semiconductor 243 and a p-type semiconductor 244. A first end region E1 of each of the semiconductors 243, 244 can be electrically connected to a first conductor 245A. The first conductor 245A can allow thermal conduction between the first end region E1 and the first surface region 241. Second end regions E2 of the semiconductors 243, 244 can be connected to respective ends of a load 247 via a second conductor 245B to form a circuit 248. The second conductor 245B can allow thermal conduction between each of the second end regions E2 and the second surface region 242. The load 247 can include one or more power-consuming components 320 as set forth above with reference to FIG. 2.

A temperature difference T1–T2 between the first temperature T1 and the second temperature T2 can result in a shift of electron energy levels in the semiconductors 243, 244. Accordingly, electrons 243C in the n-type semiconductor 243 and holes 244C in the p-type semiconductor 244 can diffuse and/or drift toward the second conductor 245B. A current 203 can thus be generated via a Seebeck effect. In certain embodiments, the current 203 can increase monotonically with an increase of the temperature difference T1–T2. For example, the current 203 can have a proportional relationship with the temperature difference T1–T2.

One or more switch devices (not shown) can be located along the circuit 248. The switch devices can be turned on and/or off controllably, for example, via control by the processor 210 shown in FIG. 3. The processor 210 can thus control generation of the current 203 by the thermoelectric device 240 and/or power supply to the load 247.

Figure 6:
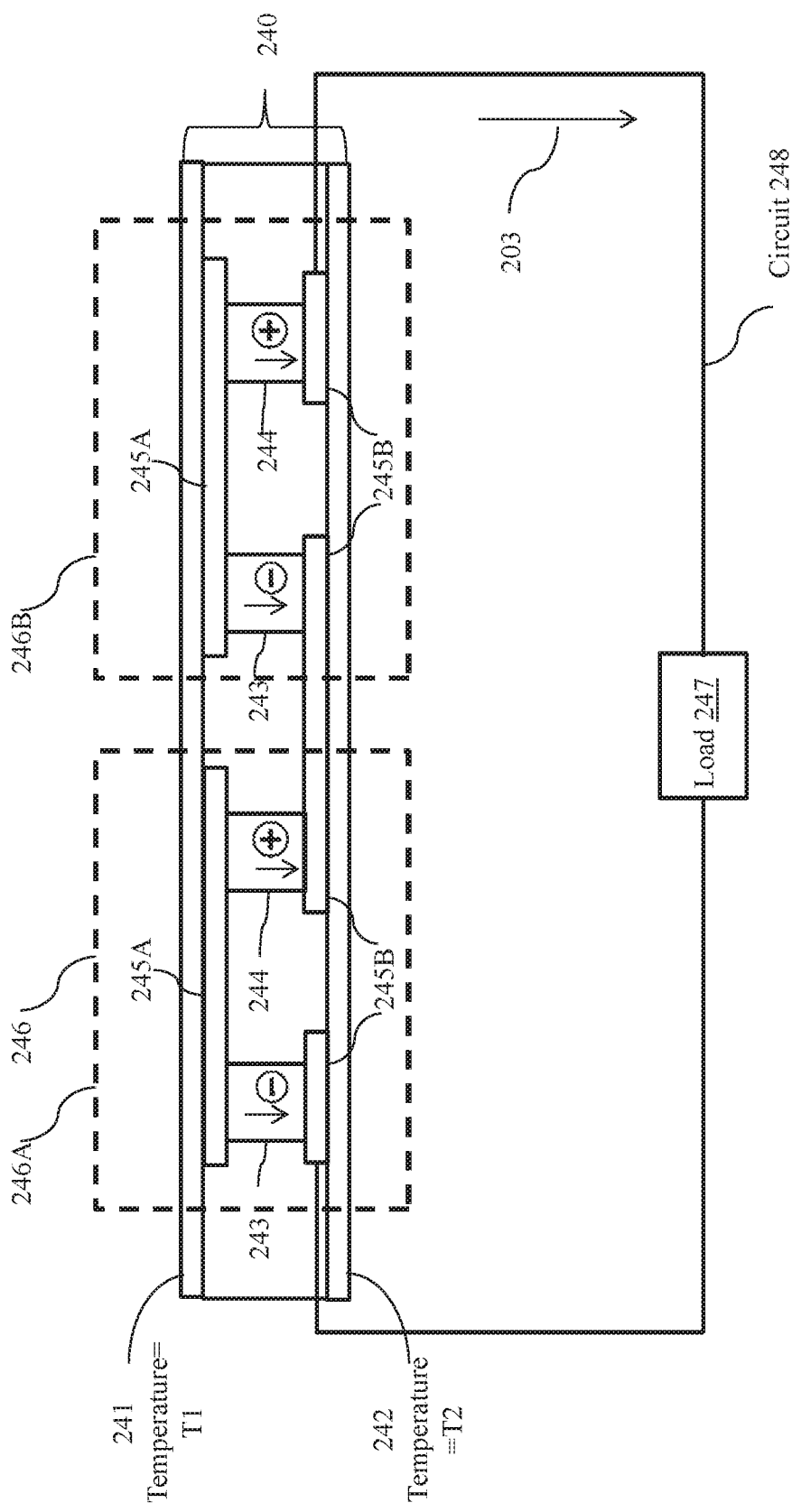
FIG. 6 is an exemplary diagram illustrating another alternative embodiment of the thermoelectric device of FIG. 3, wherein the thermoelectric device comprises a plurality of thermocouples.

Turning to FIG. 6, an alternative embodiment of the thermoelectric device 240 is shown. The thermoelectric device 240 can include two adjacent thermocouples 246 each arranged between the surface regions 241, 242. As shown in FIG. 6, the two adjacent thermocouples 246A, 246B can be electrically connected in series. The n-type semiconductor 243 of the thermocouple 246A can be electrically connected with the p-type semiconductor 244 of the thermocouple 246B via the second conductor 245B. Compared with the thermoelectric device 240 shown in FIG. 5, two thermocouples 246 can advantageously increase voltage capability of the thermoelectric device 240.

Although FIG. 6 shows the thermoelectric device 240 as including two thermocouples 246 for illustrated purposes only, the thermoelectric device 240 can include any number of thermocouples 246 interconnected between the surface regions 241, 242, without limitation. Although FIG. 6 shows the thermocouples 246 as being connected in series for illustrated purposes only, the thermocouples 246 can be connected in series, in parallel, or a combination thereof.

Figure 7:
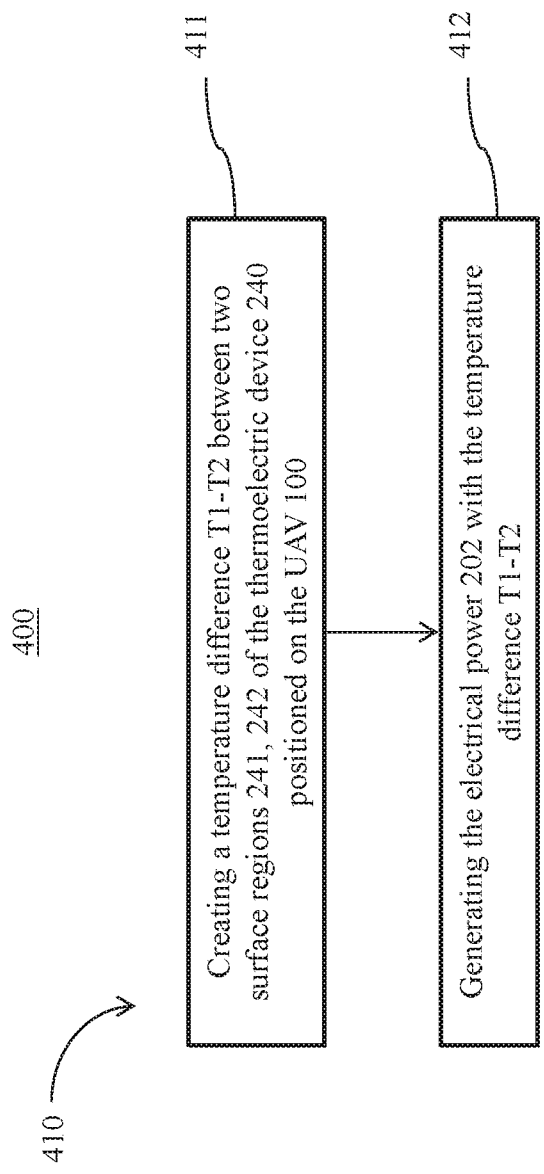
FIG. 7 is an exemplary flow chart illustrating an alternative embodiment of the method of FIG. 1, wherein the method includes creating a temperature difference using the power supply system.

Turning to FIG. 7, an alternative embodiment of the method 400 is shown. Exemplary details for converting the heat 201 into the electrical power 202, at 410, are shown in FIG. 7. The temperature difference T1–T2 can be created, at 411, between the two surface regions 241, 242 of the thermoelectric device 240 positioned on the UAV 100. For example, the first surface region 241 can be in contact with and/or in proximity with an energy component 300 as set forth above with reference to FIG. 1, to be heated by the energy component 300. The second surface region 242 can be positioned distally from the energy component 300, and thus have the temperature T2 less than T1. The temperature difference T1–T2 can thus be created.

As shown in FIG. 7, the electrical power 202 can be generated, at 412, with the temperature difference T1–T2. Stated somewhat differently, the temperature difference T1–T2 can create a voltage difference between the two conductors 245A, 245B shown in FIG. 5.

Figure 8:
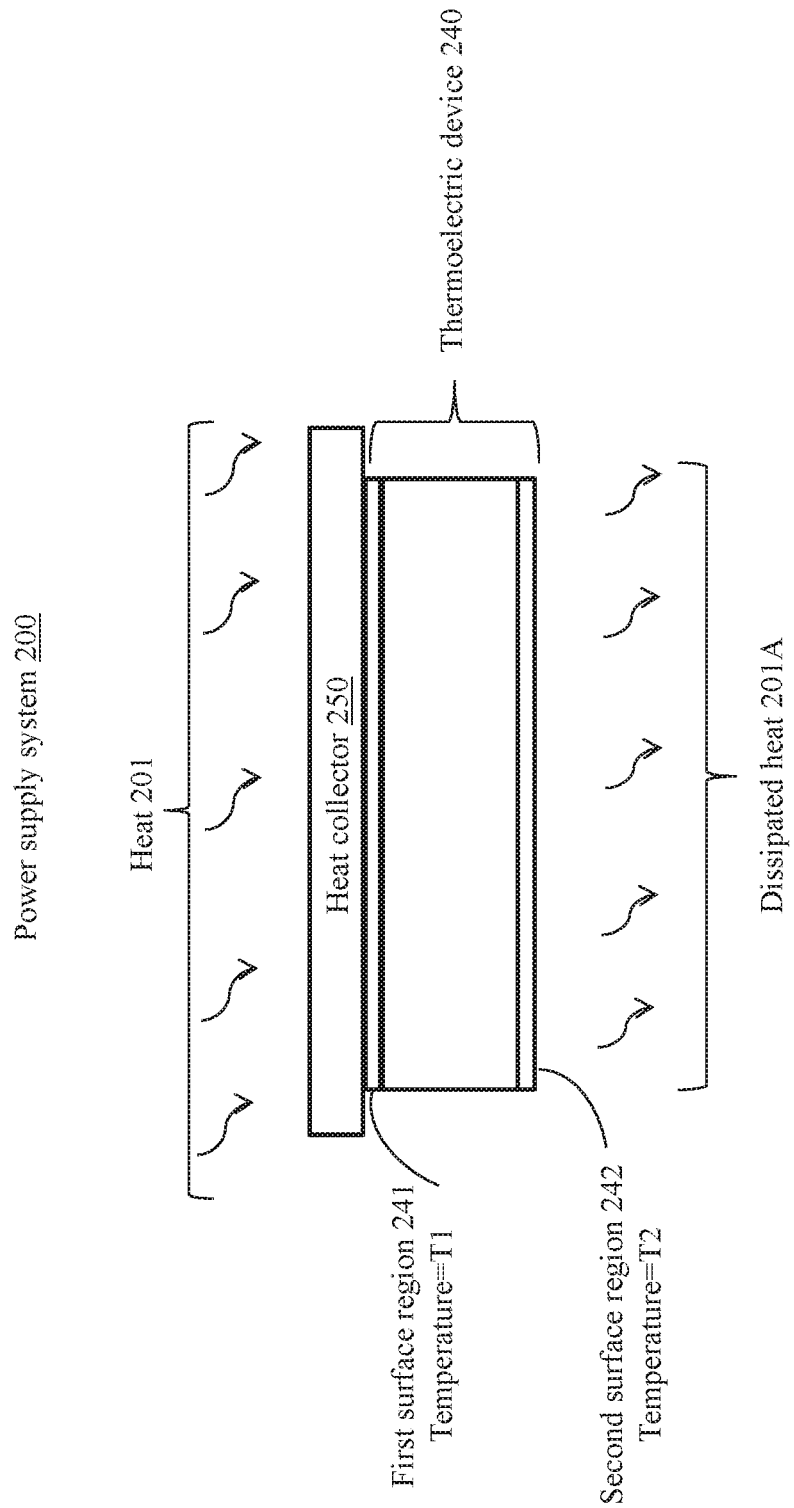
FIG. 8 is an exemplary diagram illustrating another alternative embodiment of the thermoelectric device of FIG. 3, wherein the thermoelectric device includes a heat collector.

Turning to FIG. 8, the power supply system 200 is shown as including a heat collector 250 coupled to the thermoelectric device 240. The heat collector 250 can be coupled to the thermoelectric device 240 in any manner. As shown in FIG. 8, for example, the heat collector 250 and the thermoelectric device 240 can be in direct contact with the first surface region 241 to allow thermal conduction therebetween. The heat collector 250 can collect the heat 201 to transfer and/or conduct the heat 201 to the first surface region 241.

The heat collector 250 can have high thermal conductivity. An exemplary heat collector 250 can be made of thermally conductive materials including, but not limited to, copper, aluminum, silver, graphite and/or the like. Additionally and/or alternatively, the heat collector 250 can have a large surface area for enhanced heat absorption. A structure of an exemplary heat collector 250 can have a shape of heat pipe, fin, sheet, and/or belt. Additionally and/or alternatively, in areas where surface contact forms between the heat collector 250 and the first surface region 241, thermally conductive filler such as thermal silica gel can be applied to enhance the surface contact.

In certain embodiments, the heat collector 250 can collect the heat 201 in a manner that can be more effective than the thermoelectric device 240. Advantageously, the temperature difference T1–T2 can be increased to result in increased power generation.

Figure 9:
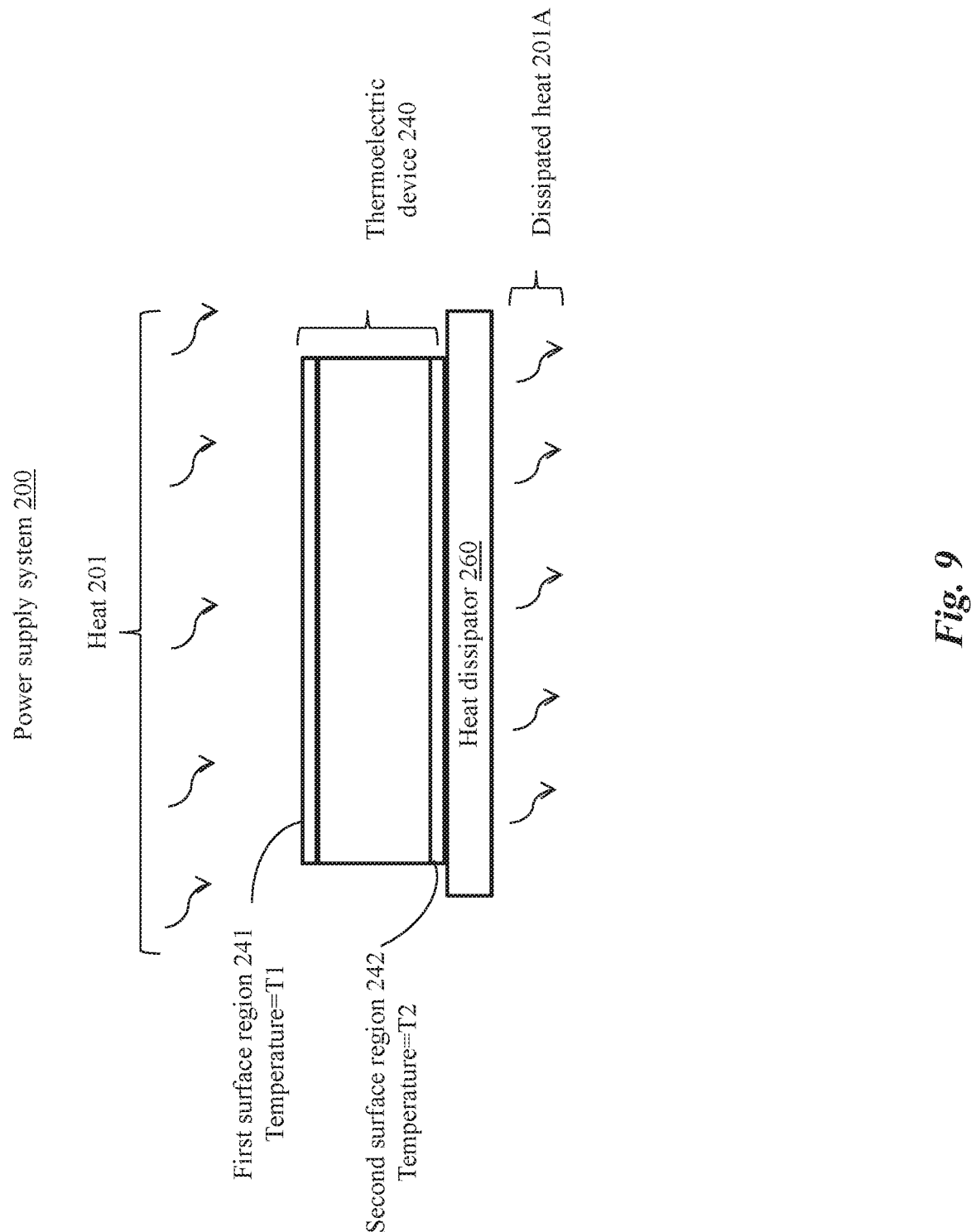
FIG. 9 is an exemplary diagram illustrating another alternative embodiment of the thermoelectric device of FIG. 3, wherein the thermoelectric device includes a heat dissipator.

Turning to FIG. 9, the power supply system 200 is shown as including a heat dissipator 260 coupled to the thermoelectric device 240. The heat collector 250 can be coupled to the thermoelectric device 240 in any manner. As shown in FIG. 8, for example, the heat collector 250 and the thermoelectric device 240 can be in direct contact with the second surface region 242 to allow thermal conduction therebetween. The heat dissipator 260 can absorb heat from at least part of the second surface region 242 for dissipation as the dissipated heat 201A. Thus, the heat dissipator 260 can cool the second surface region 242 of the thermoelectric device 240.

The heat dissipator 260 can have high thermal conductivity. An exemplary heat dissipator 260 can be made of thermally conductive materials including, but not limited to, copper, aluminum, silver, graphite and/or the like. Additionally and/or alternatively, the heat dissipator 260 can have a large surface area for enhanced heat absorption. A structure of an exemplary heat dissipator 260 can have a shape of heat pipe, fin, sheet, and/or belt. Additionally and/or alternatively, in areas where surface contact forms between the heat dissipator 260 and the second surface region 242, thermally conductive filler such as thermal silica gel can be applied to enhance the surface contact.

In certain embodiments, the heat dissipator 260 can achieve heat dissipation in a manner that can be more effective than the thermoelectric device 240. Advantageously, the temperature difference T1–T2 can be increased to result in increased power generation.

Figure 10:
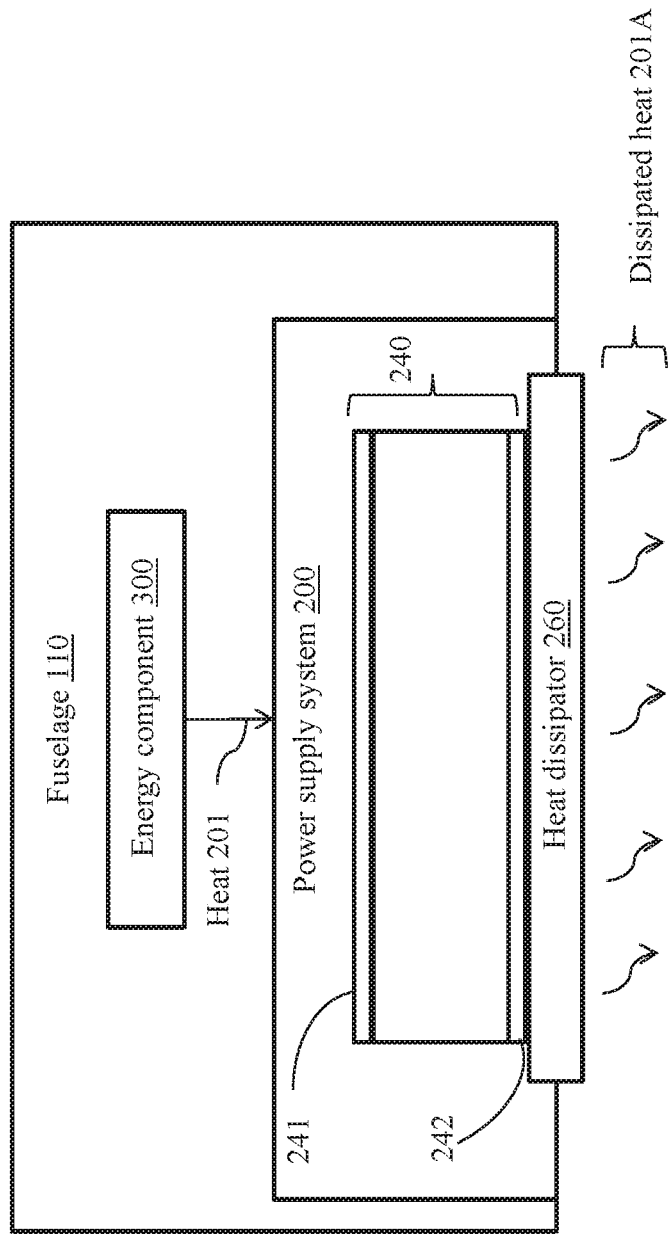
FIG. 10 is an exemplary diagram illustrating an alternative embodiment of the thermoelectric device of FIG. 9, wherein the heat dissipator is at least partially exposed to air outside the UAV that accommodates the thermoelectric device.

Turning to FIG. 10, the UAV 100 is shown to include a fuselage 110. The fuselage 110 can accommodate the power supply system 200. The heat dissipator 260 can be at least partially exposed outside the fuselage 110 to be exposed to air outside and/or adjacent to the UAV 100. The air can have a temperature that is less than the temperature inside the fuselage 110 and can advantageously remove the dissipated heat 201A from the thermoelectric device 240 at high efficiency.

Although FIG. 10 shows the heat dissipator 260 as being exposed outside the fuselage 110 for illustrated purposes only, the power supply system 200 does not necessarily include the heat dissipator 260. For example, when the power supply system 200 does not include the heat dissipator 260, the second surface region 242 can be at least partially exposed outside the fuselage 110 to be exposed to air adjacent to the UAV 100. The air can remove the dissipated heat 201A from the second surface region 242 directly.

Additionally and/or alternatively, FIG. 10 shows the fuselage 110 as accommodating at least one energy component 300 of the UAV 100. The energy component 300 can generate the heat 201 during operation. Because the energy component 300 is enclosed within the fuselage 110, the heat 201 can heat the first surface region 241 of the thermoelectric device 240 to advantageously increase the temperature difference across the thermoelectric device 240.

Figure 11:
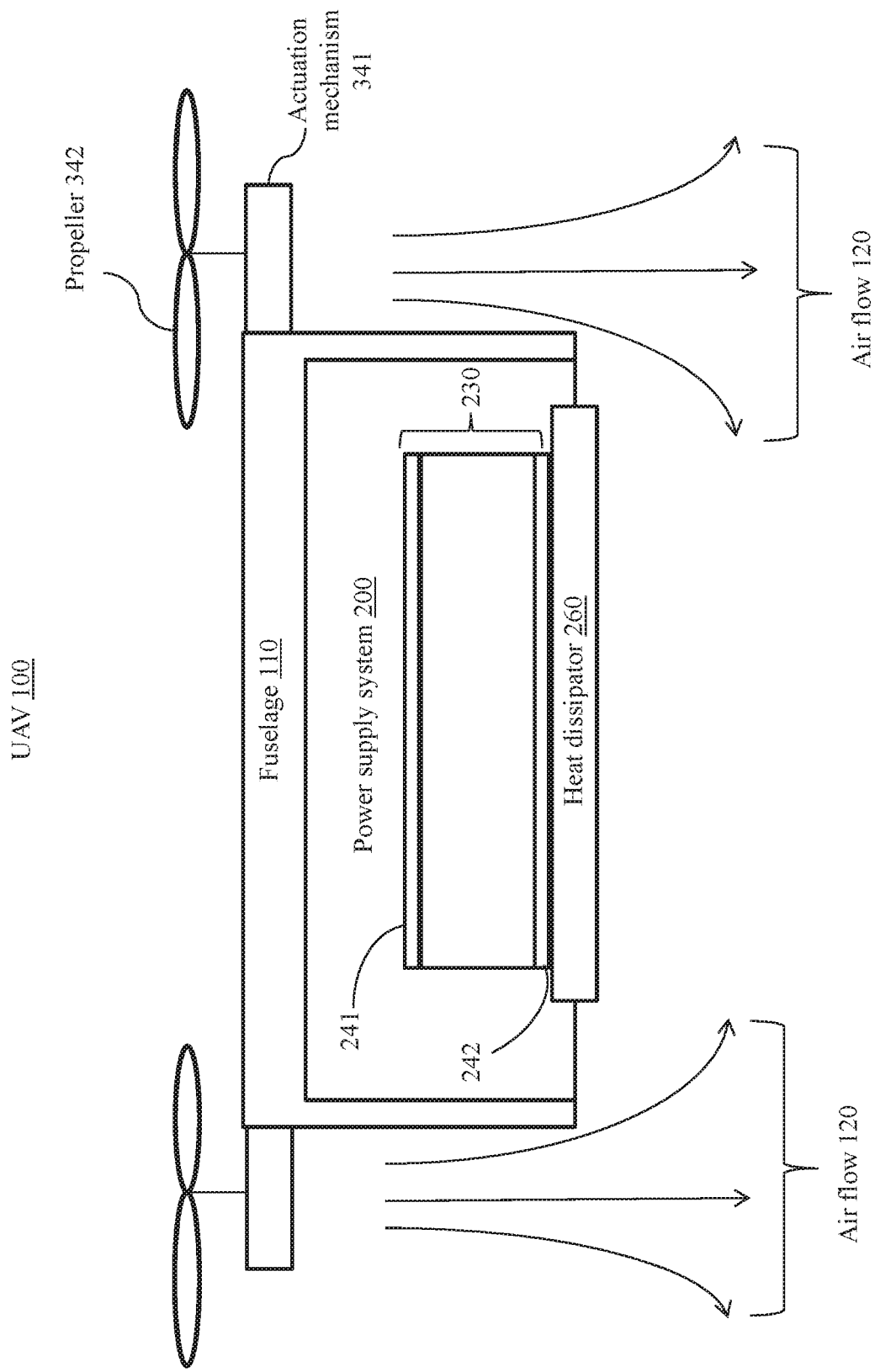
FIG. 11 is an exemplary diagram illustrating another alternative embodiment of the thermoelectric device of FIG. 9, wherein the heat dissipator is at least partially exposed to air flow generated by a UAV that accommodates the thermoelectric device.

Turning to FIG. 11, the UAV 100 is shown as including at least one propeller 342 driven by an actuation mechanism 341. During operation of the UAV 100, the propeller 342 can rotate to create an air flow 120. The air flow 120 can increase speed of air circulation outside the UAV 100 and/or cool the air adjacent to the heat dissipator 260.

When the heat dissipator 260 is at least partially exposed to the air flow 120, heat dissipation from the heat dissipator 260 can be increased. Advantageously, the heat dissipator 260 and/or the second surface region 242 of the power supply system 200 can be cooled more effectively to advantageously increase the temperature difference across the thermoelectric device 240.

Figure 12:
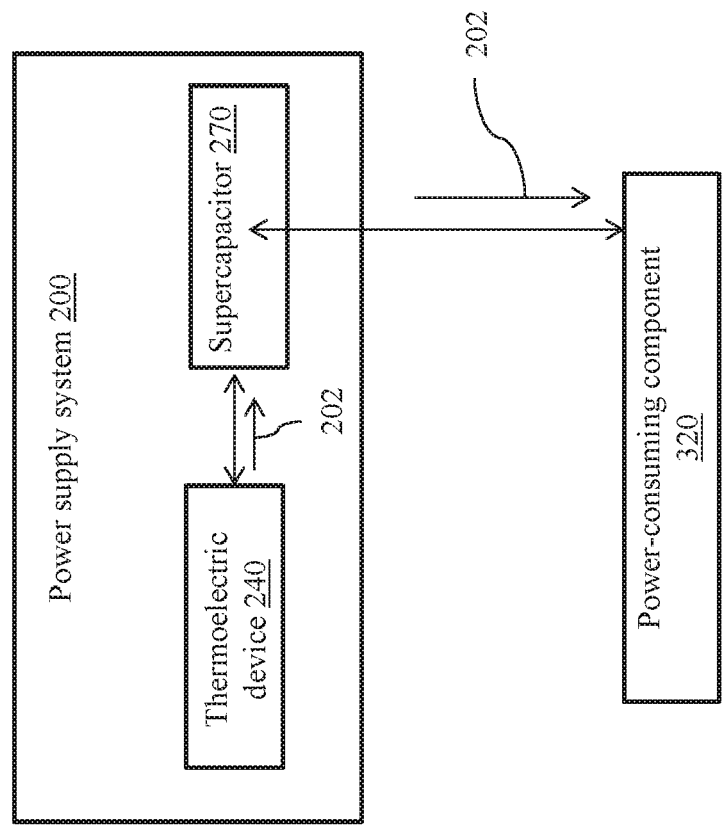
FIG. 12 is an exemplary diagram illustrating another alternative embodiment of the power supply system of FIG. 1, wherein the power supply system includes a supercapacitor.

Turning to FIG. 12, the power supply system 200 is shown as including a supercapacitor 270 electrically connected to the thermoelectric device 240. The thermoelectric device 240 can charge the electrical power 202 into the supercapacitor 270. The supercapacitor 270 can store the electrical power 202. Additionally and/or alternatively, the power supply system 200 can supply the electrical power 202 from the supercapacitor 270 to one or more of the power-consuming components 320 of the UAV 100. For example, the power supply system 200 can supply the electrical power 202 from the supercapacitor 270 to the propulsion unit 340 as set forth above with reference to FIG. 1.

Although FIG. 12 shows the power supply system 200 as including the supercapacitor 270 for illustrated purposes only, the power supply system 200 can include any other energy storage devices for storing the electrical power 202. For example, exemplary energy storage devices can include, but are not limited to, tantalum capacitors, electrolytic capacitors, electrochemical capacitors, ultracapacitors, and/or rechargeable batteries.

Figure 13:
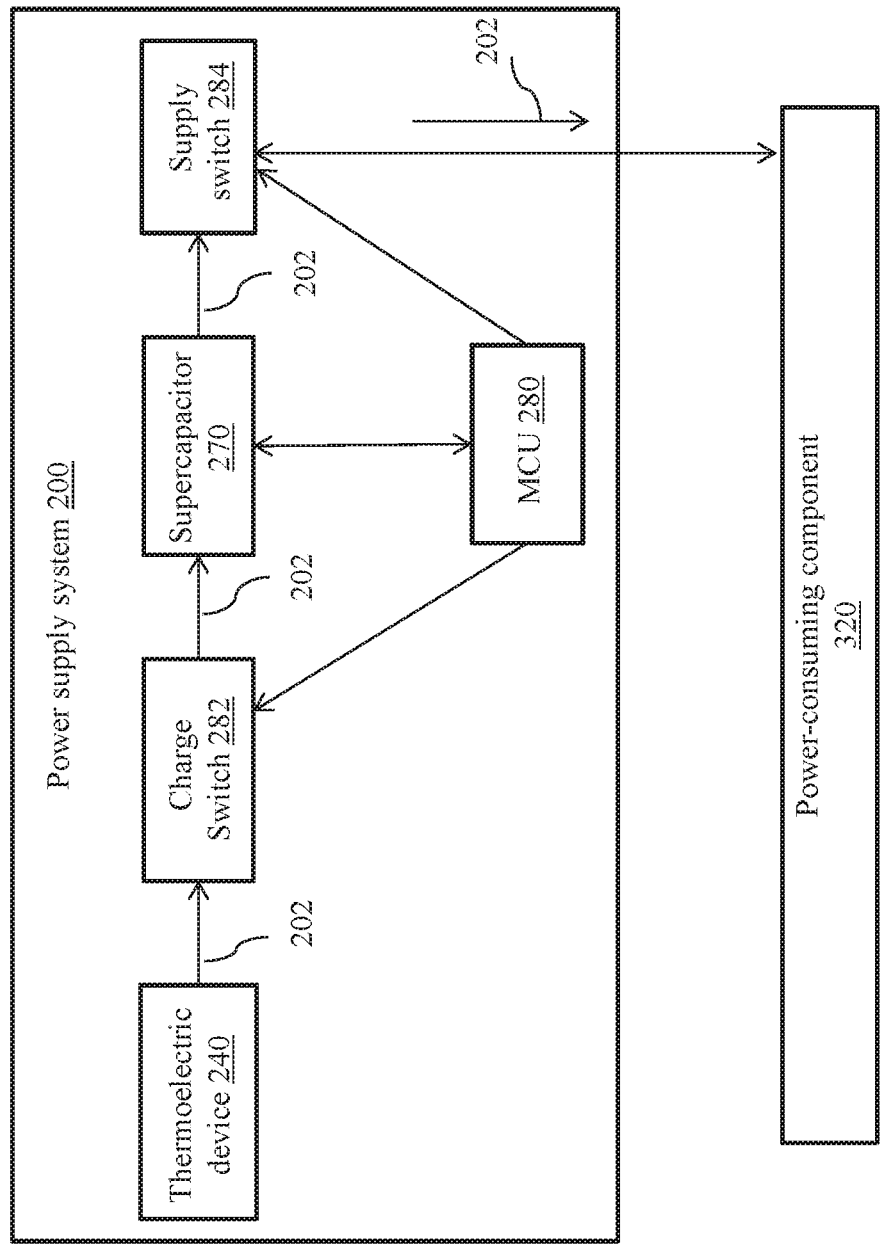
FIG. 13 is an exemplary diagram illustrating an alternative embodiment of the power supply system of FIG. 12, wherein the power supply system includes a micro-controller unit (MCU) for controlling the supercapacitor.

Turning to FIG. 13, the power supply system 200 is shown as including a micro-controller unit (MCU) 280. The MCU 280 can include a processor core, a memory, and/or programmable input/output peripherals integrated on one or more integrated circuits. The MCU 280 can be configured to control power supply from the supercapacitor 270. In certain embodiments, the MCU 280 can control power supply from the supercapacitor 270 by controlling charging of the supercapacitor 270 and/or supplying the electrical power 202 from the supercapacitor 270.

As shown in FIG. 13, the power supply system 200 can include a charge switch 282 for forming a controllable electrical connection between the thermoelectric device 240 and the supercapacitor 270. The power supply system 200 can include a supply switch 284 for forming a controllable electrical connection between the power-consuming component 320 and the supercapacitor 270. For example, each of the charge switch 282 and the supply switch 284 can include a solid-state switch and/or a solid-state relay. An exemplary charge switch 282 or an exemplary supply switch 284 can include one or more semiconductor devices, such as diodes, thyristors, and/or transistors such as bipolar transistors or metal-oxide-semiconductor field-effect transistors (MOSFETs). The charge switch 282 and/or the supply switch 284 can be coupled to the MCU 280 to be turned on and/or off by the MCU 280.

Optionally, the MCU 280 can include one or more sensors for measuring electrical parameters of the supercapacitor 270. Exemplary electrical parameters can include a voltage and/or a current of the supercapacitor 270. Based on the electrical parameters, the MCU 280 can manage charging the supercapacitor 270 and/or supplying the electrical power 202.

In one example, for the thermoelectric device 240 to generate the electrical power 202 to charge the supercapacitor 270, the MCU 280 can turn on the charge switch 282. The MCU 280 can optionally turn off the supplying switch 284 so the supercapacitor 270 is not able to supply the electrical power 202 to the power-consuming components 320. The MCU 280 can collect the voltage and/or the current of the supercapacitor 270 in real time. When the voltage and/or the current of the supercapacitor 270 meets power supply requirement of the power-consuming component 320, the MCU 280 can turn on the supplying switch 284 so the supercapacitor 270 can supply the electrical power 202 to the power-consuming components 320. The MCU 280 can optionally turn off the charge switch 282 to stop charging of the supercapacitor 270. Stated somewhat differently, the MCU 280 can activate charging of the supercapacitor 270 at a first time and power supplying from the supercapacitor 270 at a second time that is different from the first time. Optionally, the MCU 280 can activate charging of the supercapacitor 270 and power supplying from the supercapacitor 270 simultaneously.

Although FIG. 13 shows the MCU 280 as controlling the charge switch 282 and/or the supply switch 284 for illustrated purposes only, the charge switch 282 and/or the supply switch 284 can be at least partially controlled by the processor 210 as set forth above with reference to FIG. 3. In certain embodiments, the MCU 280 can be at least partially integrated with the processor 210.

Figure 14:
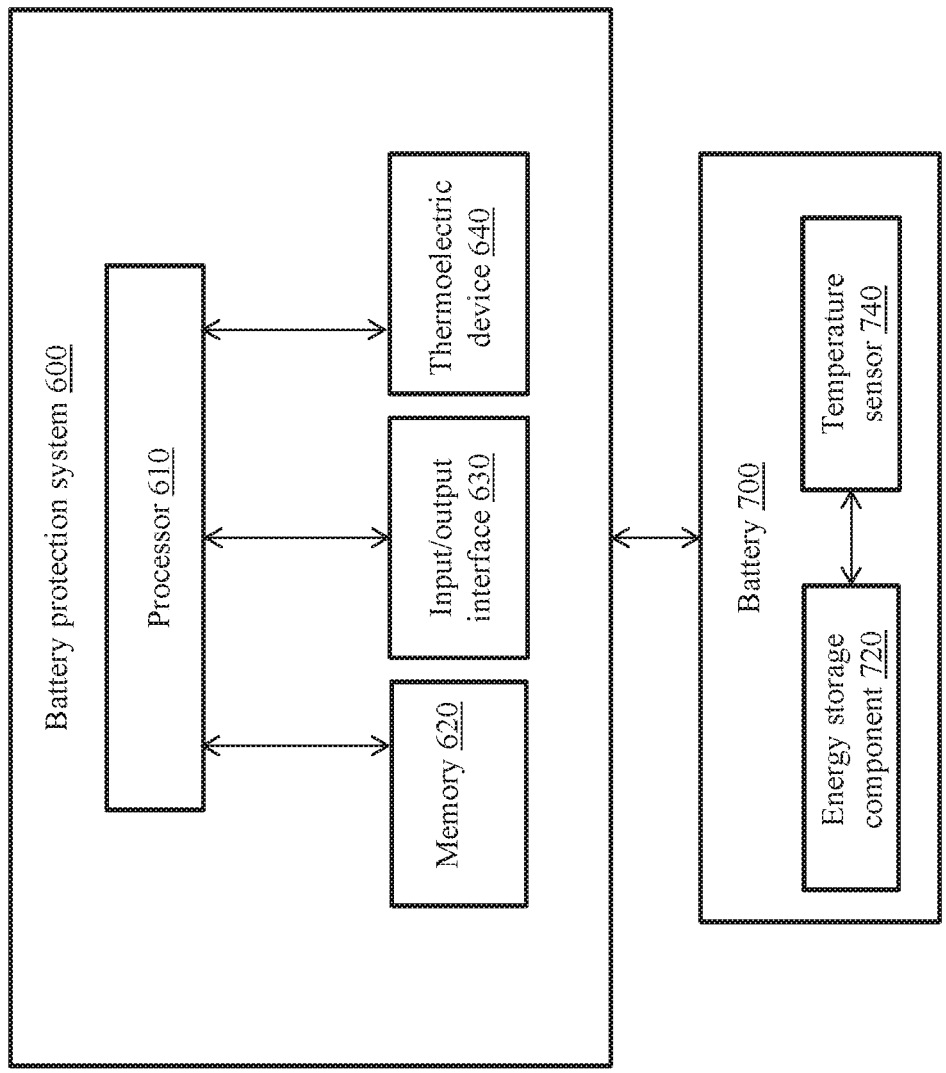
FIG. 14 is an exemplary diagram illustrating an embodiment of a battery protection system for protecting a battery.

Turning to FIG. 14, an exemplary battery protection system 600 is shown. The battery protection system 600 can include a processor 610, a memory 620, an input/output interface 630, and/or a thermoelectric device 640. The battery protection system 600 can be coupled to a battery 700. The battery 700 can include at least one energy storage component 720 that can heat up during operation. Exemplary energy storage component 720 can include one or more battery cells. For example, the battery cells can include lead-acid cells, lithium air cells, lithium-ion cells, nickel-cadmium cells, nickel-metal hydrogen cells, or a combination thereof. Optionally, the energy storage component 720 can be rechargeable and/or non-rechargeable.

In certain embodiments, the battery protection system 600 can protect the battery 700 by providing heat management for the battery 700. Stated somewhat differently, the battery protection system 600 can maintain a temperature of the battery 700 within a predetermined range, i.e., below a predetermined maximum temperature and/or above a predetermined minimum temperature.

Alternatively and/or additionally, as shown in FIG. 14, a temperature sensor 740 can be positioned at least partially in proximity to, and/or in contact with, the energy storage component 720. The temperature sensor 740 can sense a surface temperature of the energy storage component 720. The temperature sensor 740 can be in communication with the processor 610 via the input/output interface 630, for example, for the processor 610 to obtain a temperature status of the energy storage component 720.

Although FIG. 14 shows the temperature sensor 740 as being located within the battery 700 for illustrated purposes only, the temperature sensor 740 can be installed at any suitable position relative to the battery 700. For example, the temperature sensor 740 can be at least partially positioned at a surface of the battery 700. In that case, the temperature sensor 740 can sense a surface temperature of the battery 700.

Figure 15:
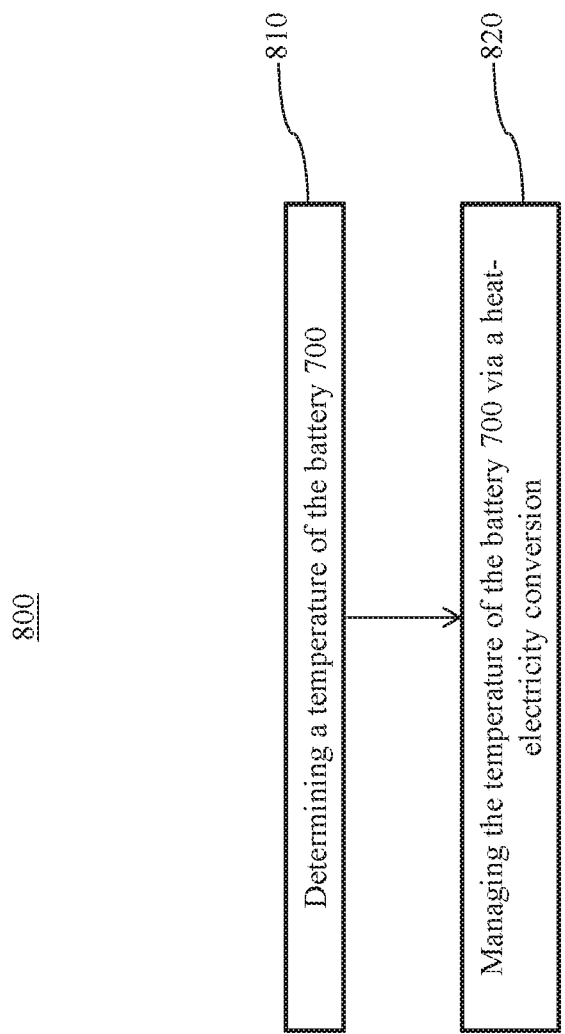
FIG. 15 is an exemplary top-level flow chart illustrating an embodiment of a method for protecting a battery using the battery protection system of FIG. 14.

Turning to FIG. 15, an exemplary method 800 for protecting the battery 700 is shown. In one embodiment, the method 800 can be implemented on the battery protection system 600 set forth above with reference to FIG. 14. A temperature of the battery 700 can be determined, at 810. For example, the temperature of the battery 700 can be determined via the temperature sensor 740 set forth above with reference to FIG. 14. The temperature of the battery 700 can be managed, at 820, via a heat-electricity conversion. For example, the temperature of the battery 700 can be maintained via the thermoelectric device 640 (shown in FIG. 14). The heat-electricity conversion can be implemented by the thermoelectric device 640 in a manner that is based on the determined temperature of the battery 700.

By using the method 800, the battery protection system 600 can maintain the temperature of the battery 700 within a predetermined range of operation temperature. Thus, overheating and/or overcooling of the battery 700 can be prevented. Performance and/or life time of the battery 700 can be improved.

Figure 16:
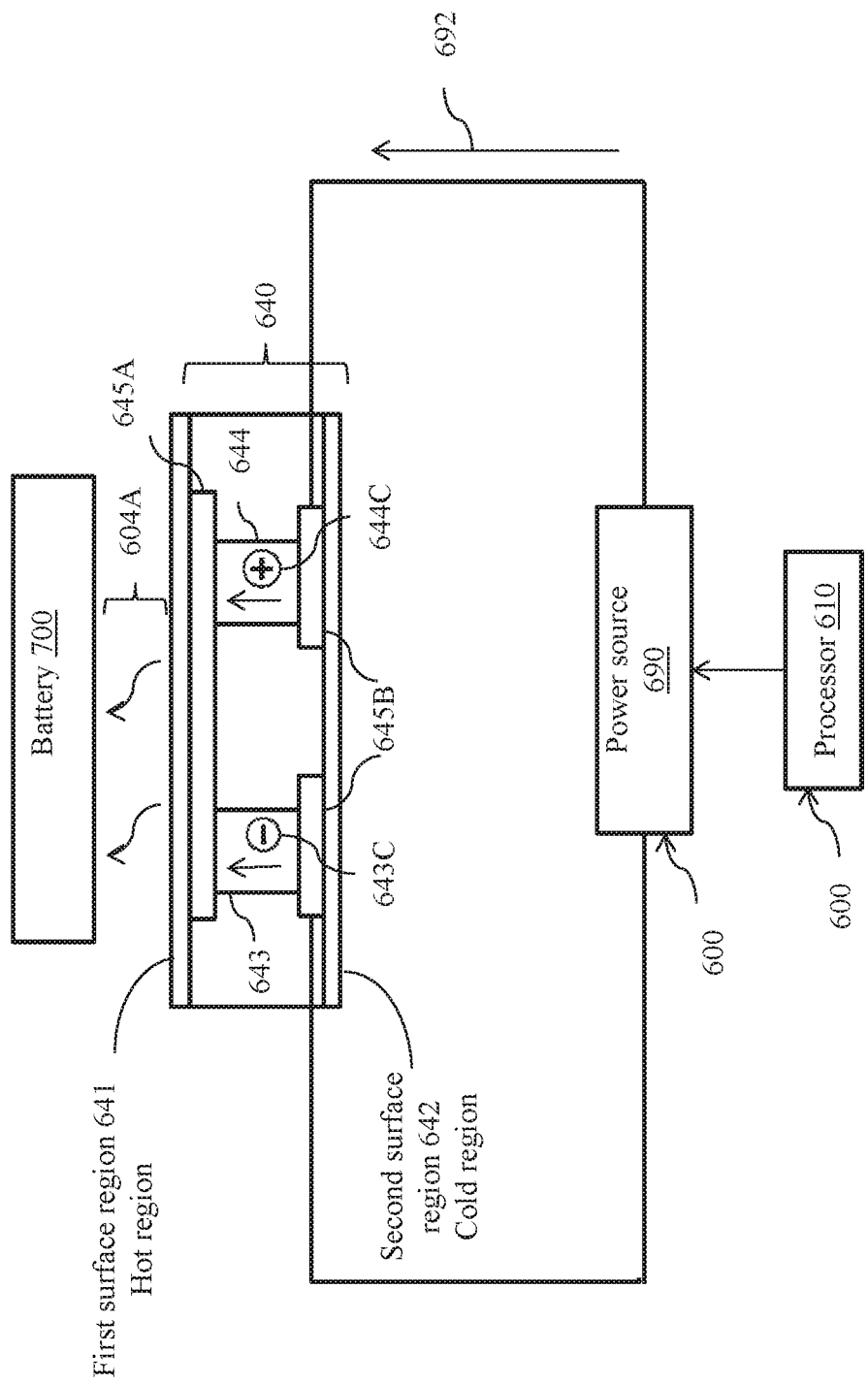
FIG. 16 is an exemplary diagram illustrating an alternative embodiment of the battery protection system of FIG. 14, wherein the battery protection system is configured to heat the battery via a first Peltier effect.

Turning to FIG. 16, the battery protection system 600 is shown as including a power source 690. The processor 610 can be coupled with the power source 690 to control a voltage and/or current outputted from the power source 690. As shown in FIG. 16, the power source 690 can provide an electric current 692 to the thermoelectric device 640. The electric current 692 can flow in a first direction for electrons 643C in the n-type semiconductor 643 and holes 644C in the p-type semiconductor 644 to diffuse and/or drift toward the first conductor 645A from the second conductor 645B, result in heat being carried by the electrons 643C and/or holes 644C toward the first conductor 645A. As shown in FIG. 16, the electric current 692 can flow in the first direction by flowing from the p-type semiconductor 644 to the n-type semiconductor 643. Stated somewhat differently, the electric current 692 flowing in the first direction shown in FIG. 16 can reach the p-type semiconductor 644 prior to reaching the n-type semiconductor 643.

Thus, the first surface region 641 and the second surface region 642 can respectively become a hot region and a cold region. That is, the temperature T1 of the first surface region 641 can be greater than the temperature T2 of the second surface region 642. The first surface region 641 can transfer heat 604A to the battery 700 to heat the battery 700. Thus, the electric current 692 can generate the heat 604A via a first Peltier effect.

The battery protection system 600 can heat the battery 700 upon determining whether the temperature of the battery 700 is less than a predetermined low temperature threshold TL. Advantageously, overcooling of the battery 700 can be prevented.

Optionally, the processor 610 can control magnitude of the electric current 692 provided by the power source 690 to adjust the first Peltier effect. Stated somewhat differently, the processor 610 can control the magnitude of the electric current 692 to adjust temperature difference across the thermoelectric device and/or to adjust the amount of the heat 604A for heating the battery 700. For example, the magnitude of the electric current 692 can be at least partially based on a temperature difference between the battery 700 and the predetermined low temperature threshold TL. For example, the processor 610 can control the magnitude of the electric current 692 to be greater when the temperature difference is greater.

Although FIG. 16 shows the battery 700 as being positioned from the first surface region 641 for illustrated purposes only, the battery 700 can be at least partially in contact with the first surface region 641 to advantageously improve thermal conduction therebetween.

Figure 17:
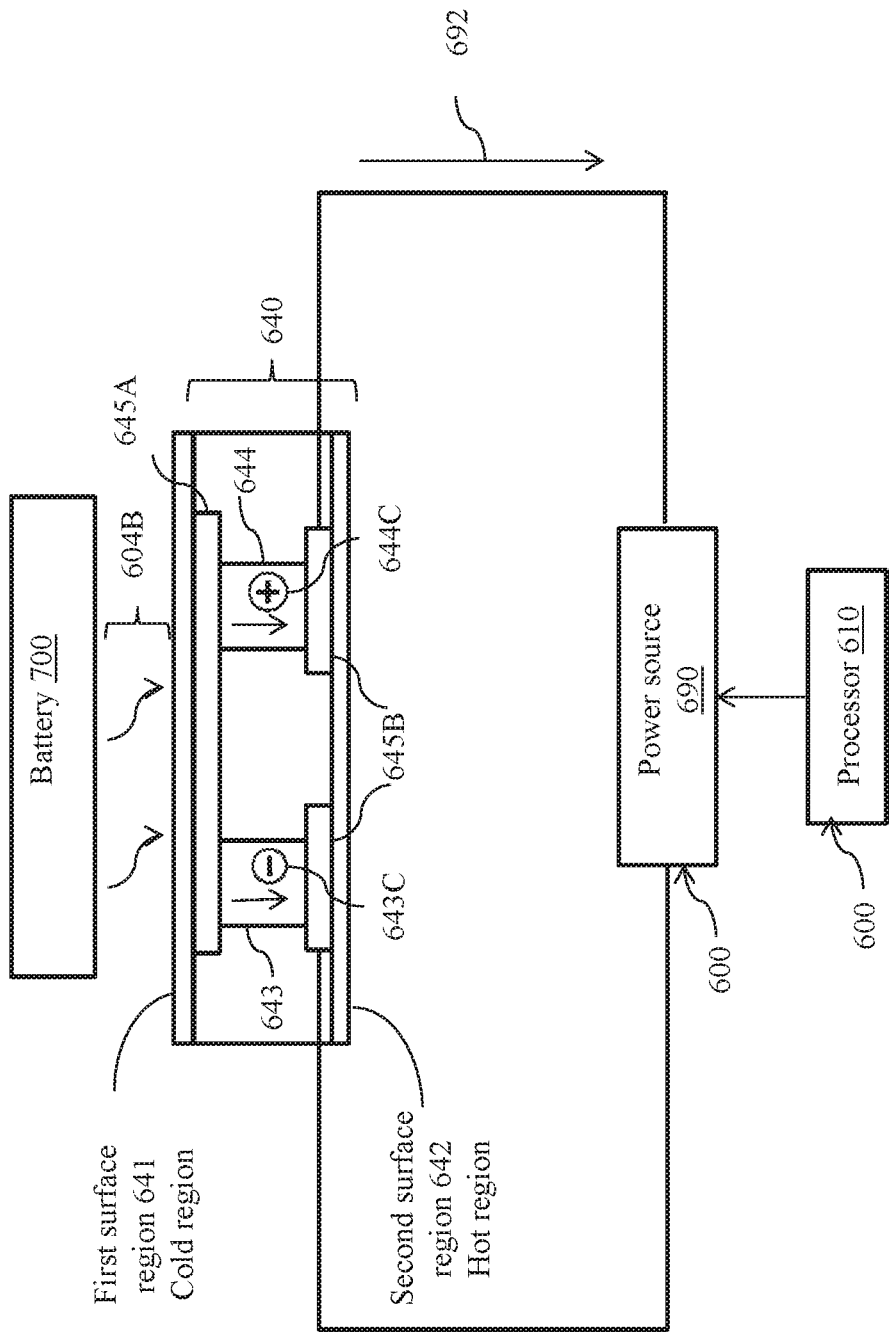
FIG. 17 is an exemplary diagram illustrating another alternative embodiment of the battery protection system of FIG. 14, wherein the system is configured to cool the battery via a second Peltier effect.

Turning to FIG. 17, the power source 690 is shown as provided the electric current 692 flowing in a second direction. That is, electrons 643C in the n-type semiconductor 643 and holes 644C in the p-type semiconductor 644 can diffuse and/or drift toward the second conductor 645B from the first conductor 645A, resulting in heat being carried by the electrons 643C and/or holes 644C toward the second conductor 645B. As shown in FIG. 16, the electric current 692 can flow in the second direction by flowing from the n-type semiconductor 643 to the p-type semiconductor 644. Stated somewhat differently, the electric current 692 flowing in the second direction can reach the n-type semiconductor 643 prior to reaching the p-type semiconductor 644.

Thus, the first surface region 641 and the second surface region 642 can respectively become a cold region and a hot region. That is, the temperature T1 of the first surface region 641 can be less than the temperature T2 of the second surface region 642. The first surface region 641 can draw heat 604B from the battery 700 to cool, and/or force cool, the battery 700. Thus, the electric current 692 can draw the heat 604B via a second Peltier effect.

The battery protection system 600 can force cool the battery 700 upon determining whether the temperature of the battery 700 is greater than a first predetermined high temperature threshold $T_{H1}$. Advantageously, overheating of the battery 700 can be prevented.

Optionally, the processor 610 can control magnitude of the electric current 692 via the power source 690 to adjust the second Peltier effect. Stated somewhat differently, the processor 610 can control the magnitude of the electric current 692 to adjust temperature difference across the thermoelectric device 640 and/or to adjust the amount of the heat 604B for force cooling the battery 700. For example, the magnitude of the electric current 692 can be at least partially based on a temperature difference between the battery 700 and first predetermined high temperature threshold $T_{H1}$. For example, the processor 610 can control the magnitude of the electric current 692 to be greater when the temperature difference is greater.

Figure 18:
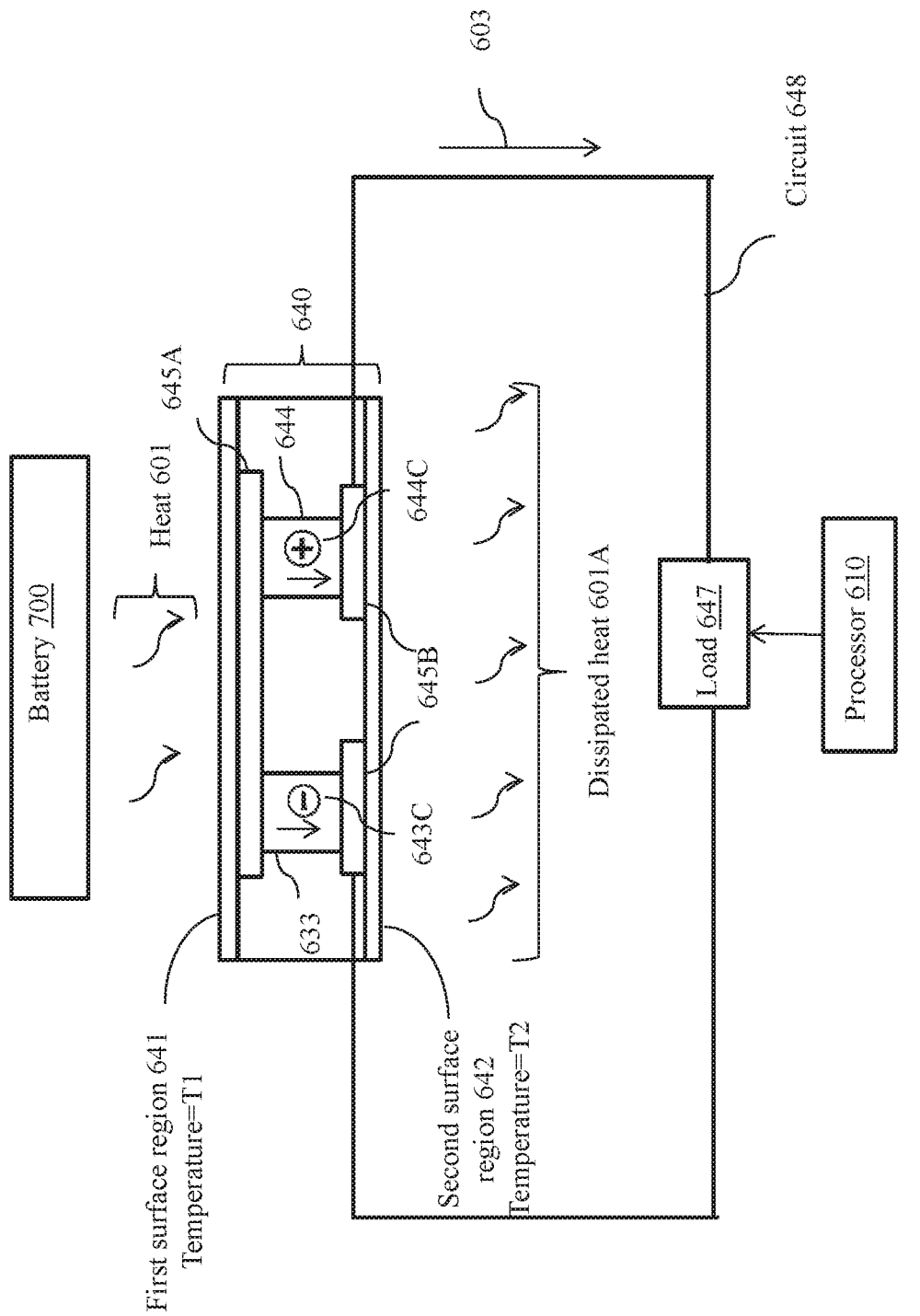
FIG. 18 is an exemplary diagram illustrating another alternative embodiment of the system of FIG. 14, wherein the system is configured to cool the battery via a Seebeck effect.

Turning to FIG. 18, the thermoelectric device 640 is shown as being electrically connected to the load 647 to form the circuit 648 in a similar manner as set forth above with reference to FIG. 5. The circuit 648 can be a conductive path for effectuating the Seebeck effect via the thermoelectric device 640.

As shown in FIG. 18, the heat 601 produced by the battery 700 can be conducted to the first surface region 641 of the thermoelectric device 640. As shown in FIG. 18, the dissipated heat 601A can escape form the thermoelectric device 640 via the second surface region 642. Stated somewhat differently, the second surface region 642 of the thermoelectric device 640 can be cooled. The temperature difference T1–T2 between the first surface region 641 and the second surface region 642 can generate the electrical power 602 (shown in FIG. 19). Stated somewhat differently, the temperature difference T1–T2 can generate an electric potential difference between the first surface region 641 and the second surface region 642 and accordingly generate the current 603 for flowing through the load 647.

The battery protection system 600 can control the temperature difference T1–T2 between the first surface region 641 and the second surface region 642 of the thermoelectric device 640 to control the Seebeck effect of the thermoelectric device 640. For example, the processor 610 can control switch devices (not shown) for connecting one or more selected power-consuming components 720 (shown in FIG. 19) as the load 647 to form the circuit 648. Stated somewhat differently, the processor 610 can select the power-consuming components 720 to be connected as the load 647. Based on power consumption of the connected power-consuming components 720, the load 647 can have different total power consumption. Magnitude of the current 603 can thus be adjusted based on selection of the power-consuming components 720. Accordingly, flow of electrons 643C in the n-type semiconductor 643 and holes 644C in the p-type semiconductor 644 diffusing and/or drifting toward the second conductor 645B can be adjusted. Speed of reducing the temperature difference T1–T2 across the thermoelectric device 640 can thus be adjusted. Advantageously, efficiency of cooling the battery 700 can be adjusted.

Additionally and/or alternatively, efficiency of cooling the battery 700 can be adjusted by adjusting distance between the battery 700 and the first surface region 641. For example, by decreasing the distance between the battery 700 and the first surface region 641, the temperature difference T1–T2 can be increased. The electric potential difference generated across the thermoelectric device 640 can be increased, and the current 603 can be increased even if the load 647 remains constant. Efficiency of cooling the battery 700 can be increased.

Although FIG. 18 shows the battery 700 as being positioned from the first surface region 641 for illustrated purposes only, the battery 700 can be at least partially in contact with the first surface region 641 to advantageously improve thermal conduction therebetween and/or increase efficiency to cool the battery 700.

In one embodiment, the battery protection system 600 can force cool the battery 700 using the Seebeck effect upon determining whether the temperature of the battery 700 is greater than the first predetermined high temperature threshold $T_{H1}$. Advantageously, overheating of the battery 700 can be prevented.

In another embodiment, the battery protection system 600 can force cool the battery 700 using the Seebeck effect upon determining whether the temperature of the battery 700 is greater than a second predetermined high temperature threshold $T_{H2}$ and lower than the first high temperature threshold $T_{H1}$. The second high temperature threshold $T_{H2}$ can be lower than the first high temperature threshold $T_{H1}$. For example, when the temperature of the battery 700 is greater than the first high temperature threshold $T_{H1}$, the battery protection system 600 can force cool the battery 700 using the second Peltier effect. Because the second Peltier effect can have a higher cooling efficiency than the Seebeck effect, the battery 700 can advantageously be cooled at a higher efficiency when cooling is of greater urgency.

Optionally, the battery protection system 600 can include the heat collector 250 (shown in FIG. 8) coupled to the thermoelectric device 640 for collecting the heat 601 from the battery 700. Additionally and/or alternatively, the battery protection system 600 is shown as including the heat dissipator 260 (shown in FIG. 9) coupled to the thermoelectric device 640 for cooling the second surface region 642.

Additionally and/or alternatively, the battery 700 can be the power battery 310 (shown in FIG. 1) used for powering the UAV 100 shown in FIG. 1. The heat dissipator 260 can be at least partially exposed to air adjacent to the thermoelectric device 640 in a similar manner as set forth above with reference to FIG. 10. The heat dissipator 260 and/or the air can be cooled by the air flow 120 creased in a similar manner as set forth above with reference to FIG. 11.

Figure 19:
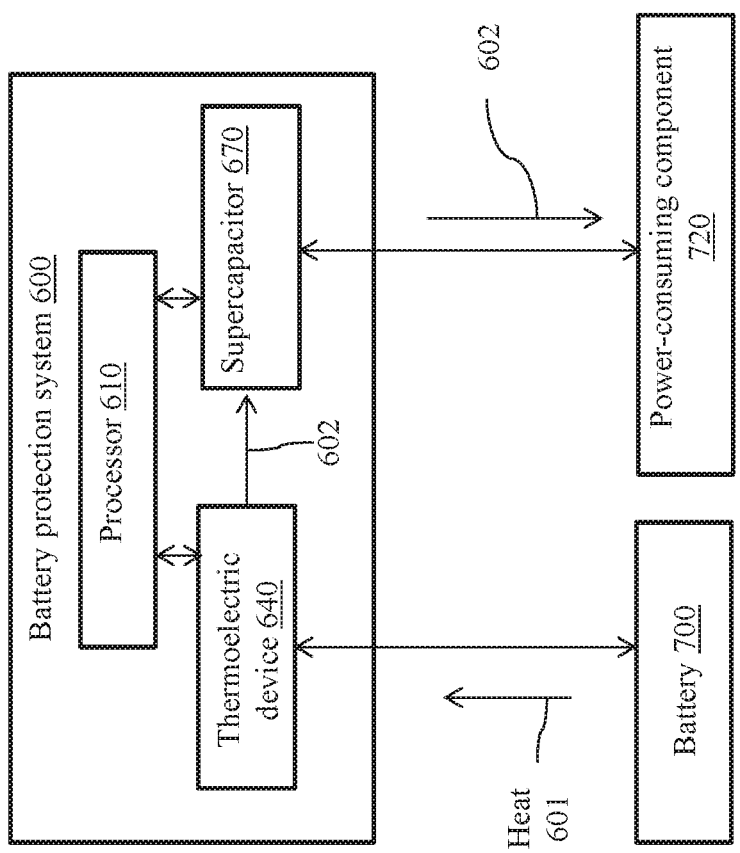
FIG. 19 is an exemplary diagram illustrating another alternative embodiment of the system of FIG. 14, wherein the system includes a supercapacitor.

Turning to FIG. 19, the battery protection system 600 is shown as including the supercapacitor 670 electrically connected to the thermoelectric device 640. The supercapacitor 670 can be used for storing the electrical power 602 generated by the thermoelectric device 640.

Additionally and/or alternatively, the supercapacitor 670 can supply the electrical power 602 to any suitable load (not shown). The load can include any power-consuming device and/or, as shown in FIG. 19, can include the power-consuming component 720. The battery protection system 600 can control the supplying of the electrical power 602 in a manner as set forth above with reference to FIG. 13.

Figure 20:
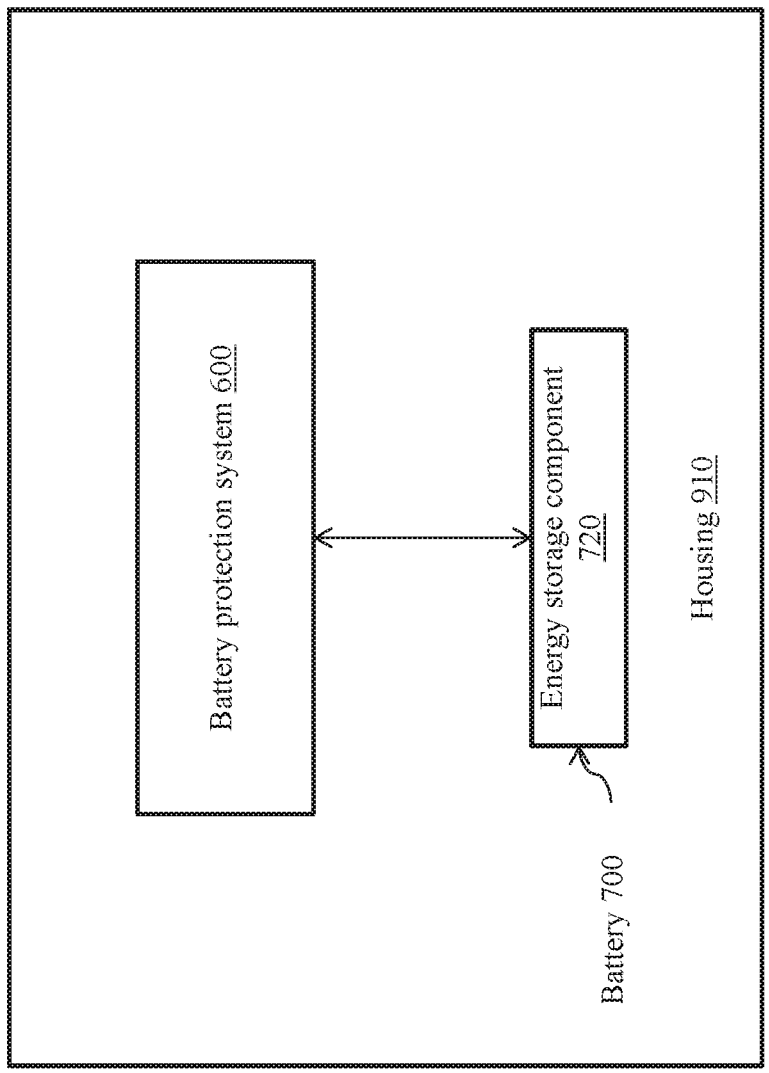
FIG. 20 is an exemplary diagram illustrating an embodiment of an intelligent battery module that includes the system of FIG. 14.

Turning to FIG. 20, an exemplary intelligent battery module 900 is shown. The intelligent battery module 900 can include a housing 910 for accommodating the battery 700. The battery 700 can include the energy storage component 720.

Additionally and/or alternatively, the intelligent battery module 900 can include the battery protection system 600 for protecting the battery 700. The housing 910 can accommodate the battery protection system 600. The battery protection system 600 can be configured to control a temperature inside the housing 910 in order to meet temperature requirements of the energy storage components 720. For example, when the temperature of the energy storage component 720 changes during operation, the temperature inside the housing 910 can change. The battery protection system 600 can cool and/or heat the energy storage component 720 so the temperature of the energy storage component 720 can be within a limit specified by the temperature requirement. The temperature inside the housing 910 can be adjusted accordingly. The energy storage component 720 can advantageously be prevented from overheating and/or overcooling. Safety of operating the intelligent battery module 900 can thus be improved.

Figure 21:
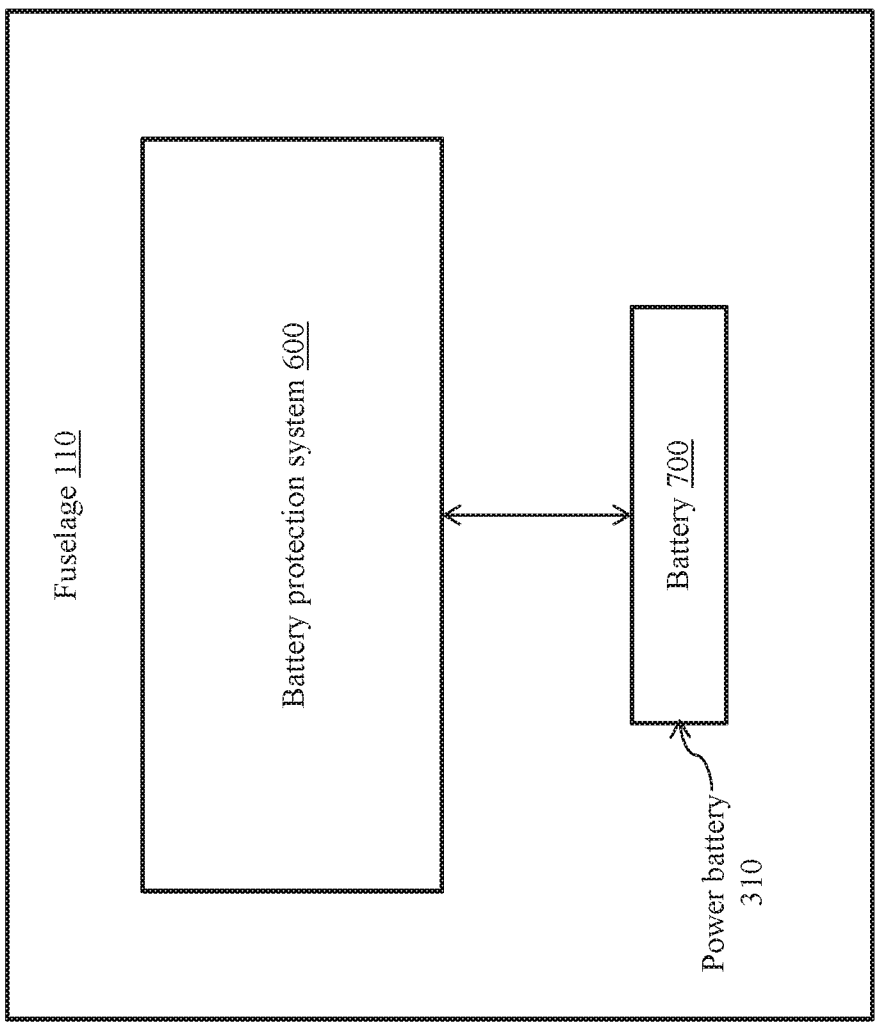
FIG. 21 is an exemplary diagram illustrating an embodiment of an UAV that includes the system of FIG. 14.

Turning to FIG. 21, an alternative embodiment of the UAV 100 is shown. The UAV 100 can include the fuselage 110 for accommodating the battery 700. The battery 700 can be used for powering the UAV 100.

Additionally and/or alternatively, the UAV 100 can include the battery protection system 600 for protecting the battery 700. The fuselage 110 can accommodate the battery protection system 600. The battery protection system 600 can be configured to control a temperature inside the fuselage 110 in order to meet temperature requirements of the battery 700. For example, when the temperature of the battery 700 changes during operation, the temperature inside the fuselage 110 can change. The battery protection system 600 can cool and/or heat the battery 700; so, the temperature of the battery 700 can be within a limit specified by the temperature requirement. The temperature inside the fuselage 110 can be adjusted accordingly. The battery 700 can advantageously be prevented from overheating and/or overcooling. Safety of operating the UAV 100 can thus be improved.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A power supply method for an unmanned aerial vehicle (UAV), comprising:
   converting heat generated by a power battery of the UAV into electrical power, the power battery including at least one of a lead-acid cell, a lithium air cell, a lithium-ion cell, a nickel-cadmium cell, or a nickel-metal hydrogen cell;
   storing the electrical power converted from the heat in a supercapacitor; and
   controlling the supercapacitor to supply the electrical power converted from the heat to a power-consuming component of the UAV to supplement a power output from the power battery in response to the UAV being accelerating, ascending, and/or moving against a head wind during a flight in air;
   wherein the power battery is a main power source of the UAV.

2. The method of claim 1, further comprising:
   determining that the UAV accelerates, ascends, and/or moves against the head wind during the flight in air.

3. The method of claim 1, further comprising:
   determining a discharge status of the power battery of the UAV; and
   controlling the supercapacitor to supply the electrical power to the UAV to supplement the power battery in response to the discharge status of the power battery indicating at least one of:
   the power battery is below a predetermined battery power threshold;
   the power battery is disconnected; or
   the power battery is in a preselected failure mode.

4. The method of claim 1, wherein converting the heat comprises generating the electrical power via a semiconductor thermoelectric device positioned on the UAV.

5. The method of claim 4, wherein generating the electrical power comprises:
   creating a temperature difference between two surface regions of the semiconductor thermoelectric device positioned on the UAV; and
   generating the electrical power with the temperature difference.

6. The method of claim 5, wherein creating the temperature difference comprises heating a first one of the two surface regions of the semiconductor thermoelectric device.

7. The method of claim 6, wherein heating the first one of the two surface regions comprises collecting heat produced by the power battery of the UAV via a heat collector and providing the collected heat to the first one of the two surface regions.

8. The method of claim 5, wherein creating the temperature difference comprises cooling a second one of the two surface regions of the semiconductor thermoelectric device.

9. The method of claim 8, wherein cooling the second one of the two surface regions comprises cooling the second one of the two surface regions via a heat dissipator by absorbing heat from at least a part of the second one of the two surface regions via the heat dissipator.

10. The method of claim 9, wherein cooling the second one of the two surface regions comprises cooling the heat dissipator with air adjacent to the UAV.

11. The method of claim 10, wherein cooling the heat dissipator comprises reducing a temperature of the air via airflow created by one or more propellers of the UAV.

12. The method of claim 1, wherein controlling the supercapacitor to supply the electrical power comprises controlling the supercapacitor to supply the electrical power from the supercapacitor to a propulsion unit of the UAV.

13. The method of claim 1, further comprising:
controlling charging of the supercapacitor.

14. The method of claim 13, wherein:
   controlling the supercapacitor to supply the electrical power comprises controlling the supercapacitor to supply the electrical power from the supercapacitor via a micro-controller unit (MCU); and/or
   controlling the charging the supercapacitor comprises controlling the charging the supercapacitor via the MCU.

15. The method of claim 14, further comprising:
sampling a voltage and/or a current of the supercapacitor.

16. The method of claim 15, wherein:
   controlling the supercapacitor to supply the electrical power comprises controlling the supercapacitor to supply the electrical power from the supercapacitor based on a result of sampling the voltage and/or the current; and/or
   controlling charging the supercapacitor comprises controlling charging the supercapacitor based on the result of sampling the voltage and/or the current.

17. The method of claim 16, wherein controlling charging the supercapacitor and controlling the supercapacitor to supply the electrical power from the supercapacitor comprise activating charging at a first time and activating supplying at a second time that is different from the first time, respectively.

18. A power supply system for an unmanned aerial vehicle (UAV), comprising:
   one or more processors, individually or collectively, configured to:
      convert heat generated by a power battery of the UAV into electrical power, the power battery including at least one of a lead-acid cell, a lithium air cell, a lithium-ion cell, a nickel-cadmium cell, or a nickel-metal hydrogen cell;
      store the electrical power converted from the heat in a supercapacitor; and
      control the supercapacitor to supply the electrical power converted from the heat to a power-consuming component of the UAV to supplement a power output from the power battery in response to the UAV being accelerating, ascending, and/or moving against a head wind during a flight in air;
   wherein the power battery is a main power source of the UAV.

19. An unmanned aerial vehicle (UAV), comprising:
the power supply system of claim 18; and
a propulsion unit coupled to the power supply system, wherein the power supply system is configured to supply power to the propulsion unit.

\* \* \* \* \*